May 9, 1944. R. W. GRISWOLD, 2D 2,348,252
AIRFOIL
Filed Nov. 23, 1940 6 Sheets-Sheet 1

UPPER SURFACE

ACCELERATING FLOW INCREASING KINETIC ENERGY UP TO MINIMUM PRESSURE POINTS

DECELERATING FLOW DECREASING KINETIC ENERGY DOWN STREAM OF MINIMUM PRESSURE POINTS.

LOWER SURFACE

Inventor:
Roger W. Griswold II,
By Barr, Borden & Fox
Attorneys

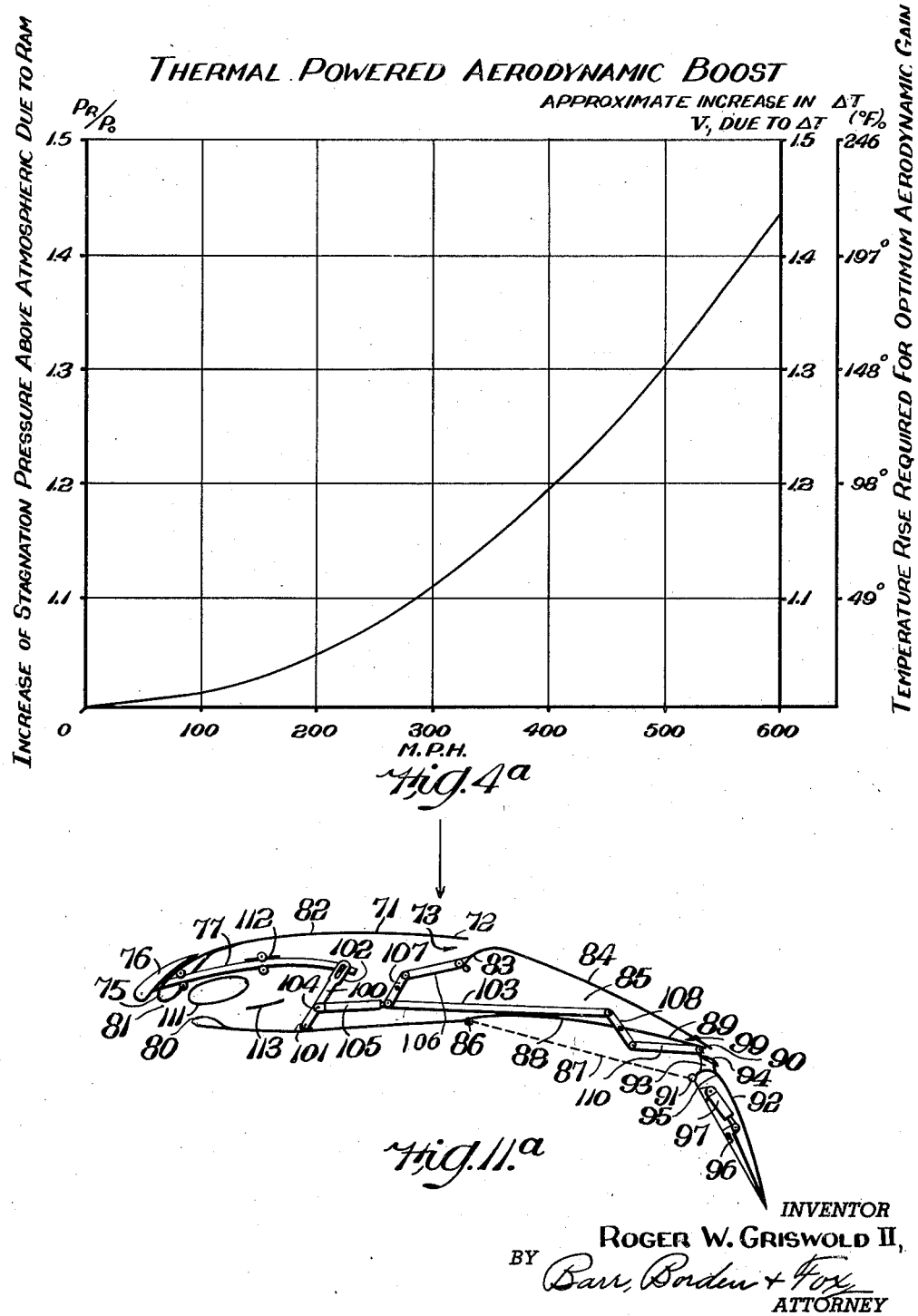

May 9, 1944.   R. W. GRISWOLD, 2D   2,348,252
AIRFOIL
Filed Nov. 23, 1940   6 Sheets-Sheet 3
Fig. 5.
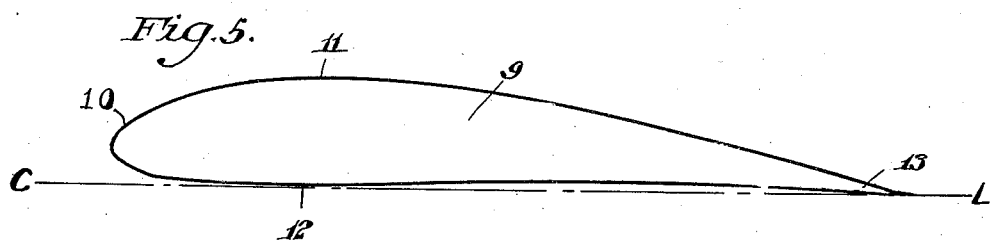
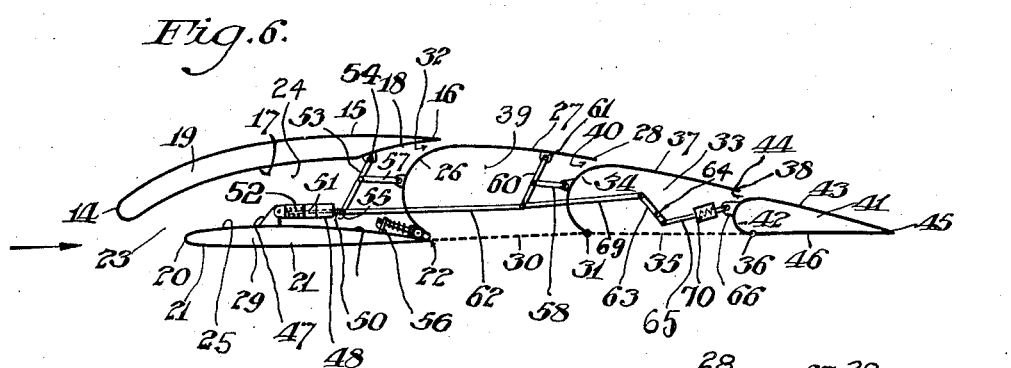
Inventor
Roger W. Griswold II,
By Bair, Borden & Fox
Attorneys May 9, 1944.  R. W. GRISWOLD, 2D  2,348,252
AIRFOIL
Filed Nov. 23, 1940  6 Sheets-Sheet 4

Fig. 10.ª

Inventor.
Roger W. Griswold II,
By Barr, Borden & Fox
Attorneys.

May 9, 1944.  R. W. GRISWOLD, 2D  2,348,252
AIRFOIL
Filed Nov. 23, 1940  6 Sheets-Sheet 5

INVENTOR
ROGER W. GRISWOLD II,
BY
ATTORNEY

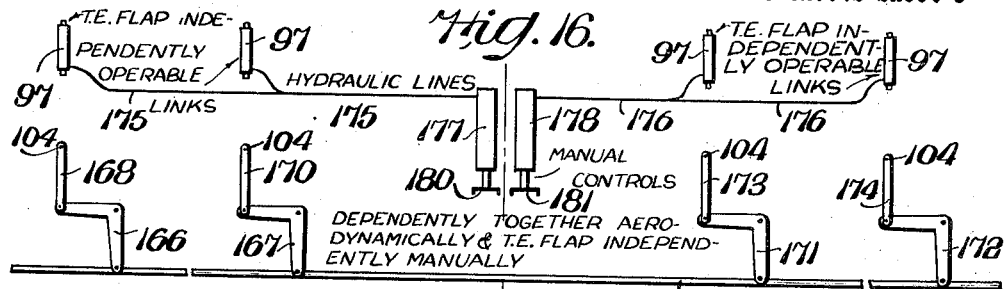
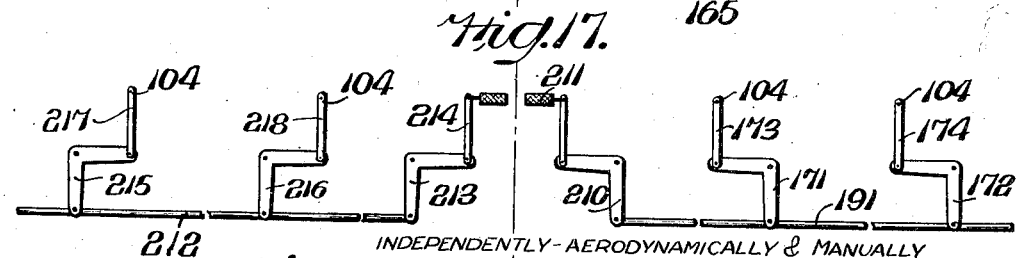
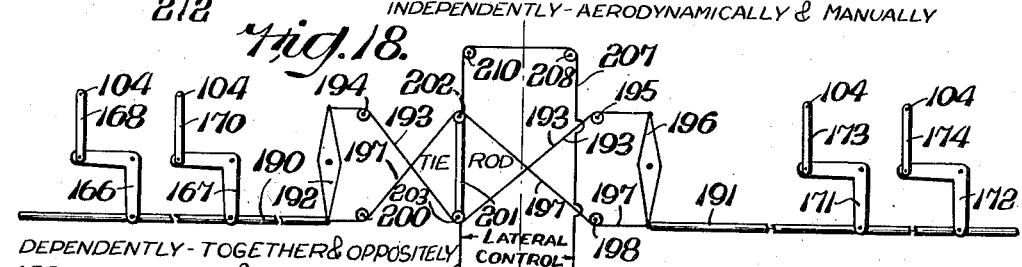
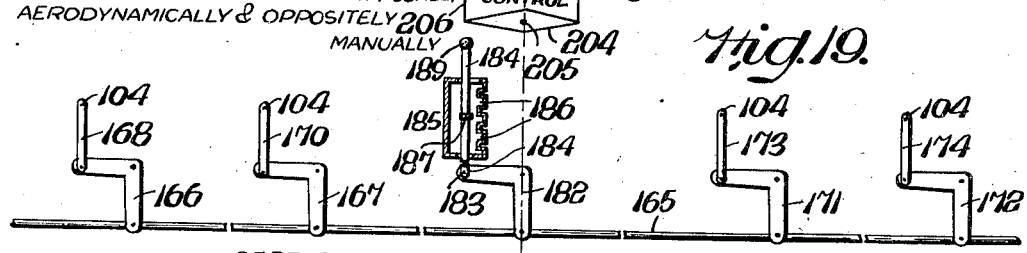

Patented May 9, 1944

2,348,252

UNITED STATES PATENT OFFICE 2,348,252

AIRFOIL

Roger W. Griswold, II, Old Lyme, Conn.

Application November 23, 1940, Serial No. 367,277

33 Claims. (Cl. 244—42)

This invention relates to an improved airfoil system for aircraft and has particular reference to a wing construction arranged to provide increased values of lift over a wide optional range of lift-to-drag ratios for relatively slow speed flight, as in taking off, climbing and landing, and is also designed to reduce drag in the normal high speed range, to provide substantially improved lift-to-drag efficiency for greater economy with increased loads and speeds, and is further effective to maintain conditions of relative flow stability about the airfoil throughout the attainable flight range and well beyond, so as to provide characteristics of inherent stability upon which adequate and satisfactory control of the aircraft depend, with particular regard to the attainment of these latter qualitative flight values at the lower end of the speed range.

In order to facilitate an understanding of this invention, a brief description of the several figures of the drawings may be incorporated at this point.

Fig. 1 represents a diagram of a typical conventional airfoil (for illustrative purposes only supposed to comprise the N. A. C. A. 4412 airfoil), operating in the high speed range at approximately +2° angle of attack, with the points of "transition" from laminar to turbulent flow on both surfaces indicated by an arrow, showing schematically to exaggerated scale the extent of the respective boundary layers over the upper and lower surfaces.

Figs. 1a and 1b respectively represent diagrammatically the relative thickness of the upper and lower boundary layers plotted with reference to the airfoil of Fig. 1, the solid line indicating the turbulent portion, while the dotted line suggests the presence of the sub-laminar boundary layers.

Fig. 4a represents a graph showing the increase of stagnation pressure above atmospheric due to ram, the temperature rise required for optimum aerodynamic gain and the approximate increment in kinetic energy of the jet discharge from thermal powered stagnation slot flow.

Fig. 5 represents a diagrammatic profile of a basic airfoil section (illustratively that known as GS-1), suitable for the delineation of the compound airfoil of this invention.

Fig. 6 represents a diagrammatic profile or section of a form of integrated airfoil according to one manifestation, disposed substantially within and comporting with the profile of Fig. 5, and comprising a forward relatively fixed section with a plurality of rearward hinged sections, in the high speed condition at a small angle of incidence or attack represented by its relation to the small arrow in advance of the leading edge indicating the direction of relative air flow.

Fig. 6a represents a fragmentary diagrammatic section of a slightly enlarged modification of Fig. 6 in which the trailing edge flap operating linkage is reversed from that of Fig. 6.

Fig. 7 represents the section of Fig. 6 in the low speed-high lift condition at an appreciably greater angle of attack as indicated by its relation to the small arrow representing the relative air flow.

Figure 8:
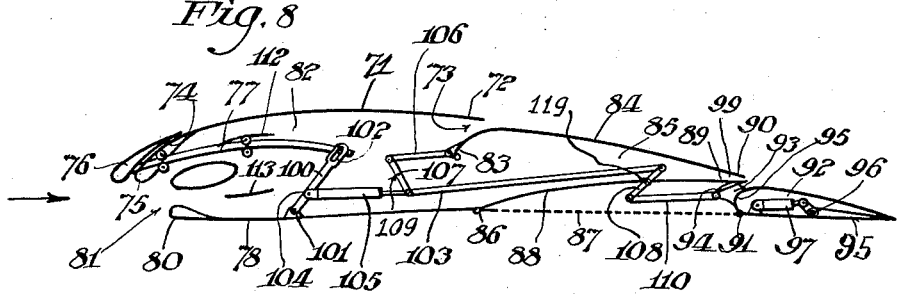

Fig. 8 represents a diagrammatic section of a modified integrated airfoil in its high speed condition.

Figure 9:
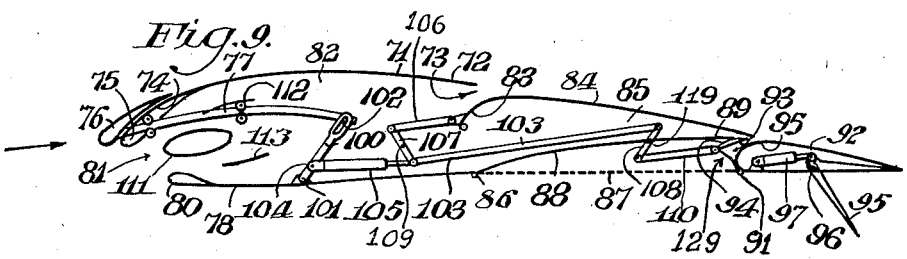

Fig. 9 represents a schematic section of an airfoil like that of Fig. 8, at a slightly greater angle of incidence, with the trailing edge flap in a depressed or lowered condition.

Figure 10:
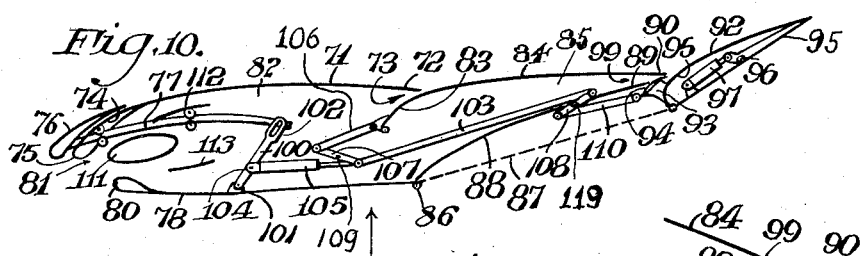

Fig. 10 represents the disclosure of Fig. 8 in its condition of temporary acceleration overload or gust responsiveness in which the airfoil is converted from the high speed condition into a negative camber condition in which the upper surface becomes generally concave while the lower surface becomes generally convex to relieve any abnormal lift pressures, by "spilling" same.

Fig. 10a represents an enlarged fragmentary diagrammatic showing of the articulated trailing edge flap of Fig. 8 with the deflector plate movable therewith in a downward or depressed attitude.

Figure 11:
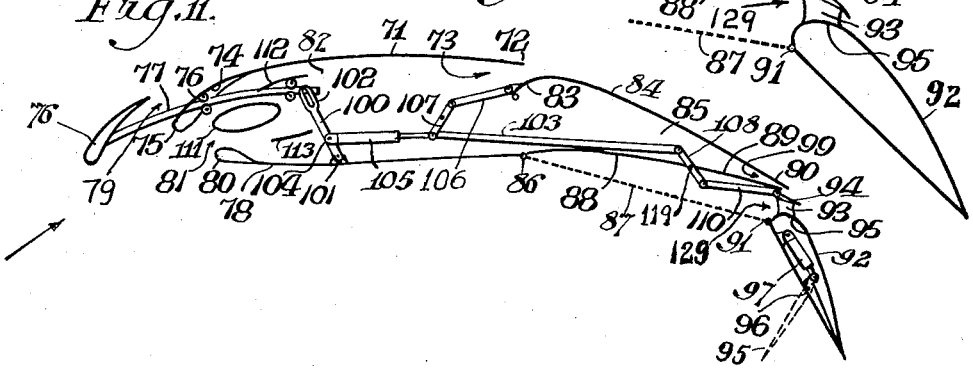

Fig. 11 represents the airfoil of Fig. 8 in a condition of high lift slow speed at a high angle of attack as indicated by the angle assumed with relation to the arrow representing the relative air flow.

Fig. 11a represents the disclosure of Fig. 8 in its condition of temporary downward gust responsiveness in which the airfoil is converted from the high speed condition into an increased positive camber condition in which the upper surface assumes greater convexity and the lower surface becomes generally concave to relieve any abnormal strain condition or negative lift pressure by "spilling" same.

Figure 12:
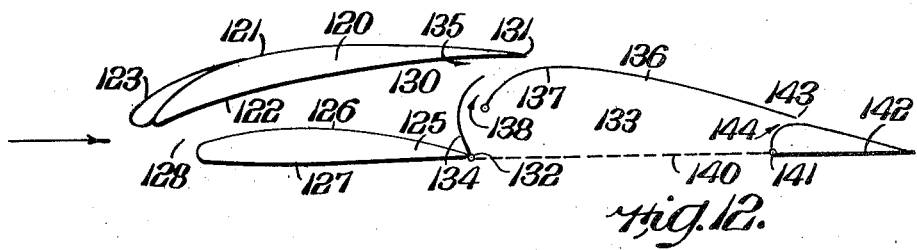

Fig. 12 represents a diagrammatic profile of a still further modified form of integrated airfoil, according to this invention, in the high speed condition.

Figure 13:
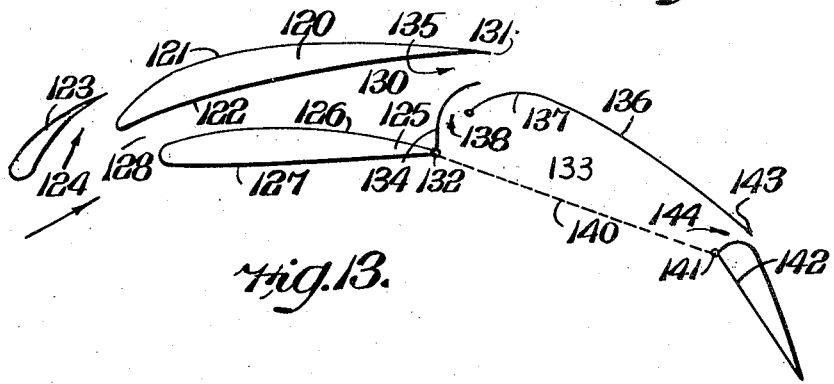

Fig. 13 represents a diagram of the airfoil of Fig. 12 in the low speed high lift condition.

Figure 14:
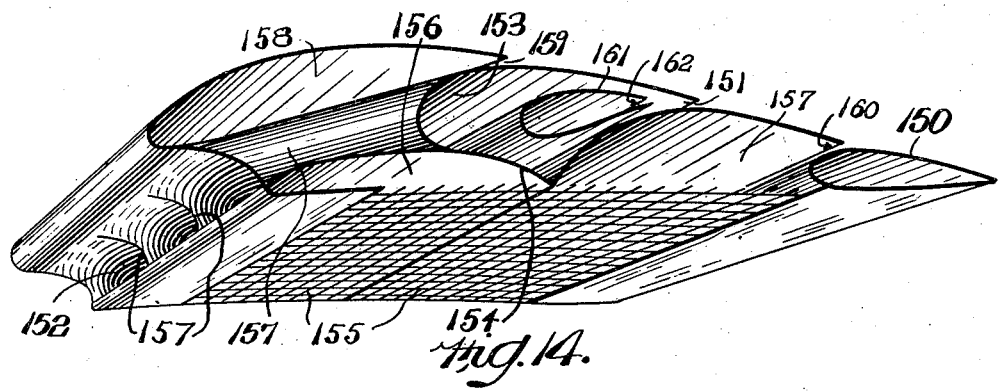

Fig. 14 represents a diagrammatic fragmentary perspective of a still further modified form of integrated wing of relatively fixed sections, or optionally having a single trailing edge flap.

Figure 15:
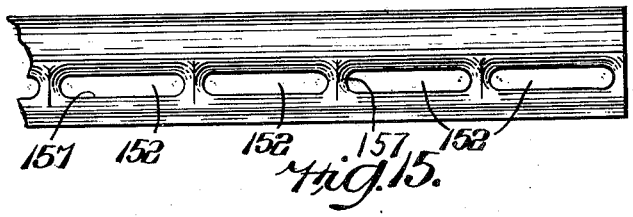

Fig. 15 represents a fragmentary diagrammatic front elevation of the wing of Fig. 14.

Fig. 16 represents schematically a wing control system of an aircraft, in plan form, showing the interconnecting wing control linkage spanwisely disposed on both sides of the longitudinal axis of the aircraft arranged to provide simultaneous wing camber variation dependently together in response to changing flight pressures, as well as independently operable trailing edge flap deflection control.

Fig. 17 represents schematically a plan form of an aircraft wing control linkage system separately and independently interconnecting the respective airfoil variable camber control linkage systems of the wings disposed on either side of the aircraft longitudinal axis independently operable, either aerodynamically or manually.

Fig. 18 represents schematically a plan form of an aircraft control linkage system interconnecting the airfoil linkage systems of aircraft wings on both sides of the aircraft longitudinal axis to provide dependent aerodynamic control, similar in effect to that of Figs. 16 and 19, concurrently with an independent manual control for dependent but opposite camber variation of the wings on both sides of the aircraft longitudinal axis.

Fig. 19 represents schematically a plan similar to Fig. 16 in which a floating manual control lever, coupled with the wing linkage system, is provided with selective camber fixation stops for dependent manual camber control. Of the several parameters which influence the relative utility of any airfoil, or wing system, the ratio between the two which determines the ultimate extremes of speed obtainable (for any given design) is often referred to as the speed range criterion, i. e., the ratio of maximum lift to minimum drag ($C_L$ max./$C_D$ min.). It is clear that to improve either one of these criteria, alone, i. e., increase maximum lift or reduce minimum drag, will contribute to the performance of the airplane by making available a greater range of speed—the absolute limits, of course, being dependent upon the loading of and power available for any particular design. Quite obviously, designers have been engaged in an unrelenting search for means to both increase maximum lift and also reduce the minimum drag of wings.

A great many years of extensive and intensive wind tunnel development research has succeeded in refining the shapes of conventional unbroken contour airfoil profiles to the point where appreciable reductions in minimum (high speed) drag have been realized in practice. This is generically designated as "streamlining." In general, these efforts to attain the ultimate streamline form for aerodynamic bodies, such as wings, have worked away from the more deeply cambered airfoil, having under surface concavity, as mostly used by nature and old style airplanes, to the so-called modern sections, the upper and lower surfaces of which are so convexly shaped that the airfoil is more nearly symmetrical and in certain instances, indeed, a fully symmetrical airfoil is used. Unfortunately, this dual convexity of the airfoil surfaces, has resulted in a sacrifice of maximum lift values and a corresponding loss in the net contribution to the speed range factor. More serious than this, from the standpoint of relative safety in flight, many of such modern airfoils have more abrupt and precipitous stall characteristics—what engineers refer to as a sharp peak lift curve—resulting in more critical stability and control problems at the lower end of the speed range. High speed gains so achieved have thus exacted as a price of the apparent progress, several retrogressive steps in other directions.

Concurrently with the airfoil shape refinement developments of the aerodynamicists, engineers have largely disposed of the aerodynamically redundant components of their airplanes with resulting large reductions in parasitic drag and correspondingly improved performance. These latter rather obvious refinements made it practical to secure further important savings in total drag by reducing wing area thereby increasing the unit wing loading. Other efforts to reduce drag have been concerned with skin frictional characteristics, from which came the conception of the aerodynamically smooth surface specifying that the grain size of the surface roughness should not exceed half the depth of the extremely thin sub-laminar boundary layer (approximately .001"). This outlawed the use of protruding rivet heads, lap joints or other excrescences on the surface. It has been the consensus of opinion of others skilled in the art that the best unbroken profile streamline form having a surface aerodynamically smooth offers the ultimate in drag reduction, short of using energy sources external to the aerodynamic system. And yet, fully two thirds of the drag of the modern high performance clean airplane arises from the turbulent boundary layers generated over a substantial part of its surfaces by the dynamic interaction of the ship and the fluid medium in which it is immersed. The high drag of the turbulent boundary layer imposes a heavy penalty on the economy of the present day airplane and if the condition is to be alleviated it appears that some fundamental means more effective than the art of aerodynamically smooth streamlining must be evolved.

This boundary layer drag, often rather inaccurately termed skin friction drag, might well be called viscous or simply friction drag, since it is due solely to the viscosity of air that the frictional shear forces in the flow dragged along by the wings are transferred to the undisturbed strata of air and thence to the earth's surface. In contrast to the unavoidable pressural drag, which is the resultant downstream component of the normal forces on the surfaces, viscous drag is the extent of our departure from the ideal, according to the concept of this invention and as such it is our last remaining formidable source of true parasite drag. Regardless of how the several variables of size, speed, wing thickness, camber, relative disposition of diverging and concerging surfaces, surface roughness, etc., may be juggled around, transition of the boundary layer flow from the laminar to the turbulent condition remains inherently functional with the flow separation wings of the prior art in the full scale turbulent range of Reynold's numbers (R. N. is the velocity-size criteria related to the kinematic viscosity of the flow, or what might be called the energy factor).

Partly due to the need for overcoming the loss in maximum lift with modern airfoils, but more particularly to meet the challenge imposed by the very considerable increase in wing loadings in recent years, designers have found it essential to utilize some sort of high lift device in order to turn out high performance aircraft and still keep landing and take-off speeds from becoming excessive. The number and variety of ways proposed to increase the lift of an airfoil seems to have run the full gamut of the human imagination, yet the results so far obtained emphatically confirm that fundamental flow control principles and thus optimum values of lift have not been realized.

Generally speaking, high lift devices may be roughly divided into two classifications according to their functional characteristics, i. e., those which control the flow (or at least partially) and those which make no such attempt. In the latter category the plain and split flaps, so commonly used at present, typify the air brake method of lower surface flow deflection, thereby increasing the positive pressural reaction on the wing, and also modifying upper surface negative pressure to a limited extent. The ultimate values of lift attainable with such arrangements have a rather definite limit of a low order of magnitude. Further, the highly disorganized turbulent flow over the upper surfaces and to the rear of such flaps, at the higher values of lift, has caused tail buffeting difficulties in several modern airplanes. Also, as would be expected, this low efficiency flow results in such poor lift drag ratios (with the split flap in particular) that no improvement, for all practical purposes, is had in the takeoff and climbing range, the same difficulty in turn giving relatively steep glide path angles and thus excessive vertical velocities for the landing of heavily loaded aircraft. Finally, any such flap necessarily involves a break in the airfoil surface, which adherents of the prior art have contended must remain aerodynamically smooth and of uninterrupted profile for attainment of the least drag.

The wing slot, in its various applications and modifications developed by the prior art, has contributed a greater degree of high incidence (low speed) flow control and thus delayed stalling angles, which has resulted in realizing higher values of maximum lift and greatly improved lift to drag ratios in the high lift range, as compared with non-flow control devices. One difficulty with the usual wing slot application arises from the relatively high angle of attack at which maximum lift occurs which has necessitated designing for an excessive range of ship pitching angles and thus awkward ground angles for the landing attitude. A more serious penalty has been imposed by the high drag (low efficiency flow control) of the wing slot in the high speed (minimum drag) range. In applying high lift devices of this type to high performance aircraft, it has accordingly been necessary, so far as the development of the prior art have advanced the wing slot principle, to provide some means to close the slots for normal flight speeds, in an attempt to simulate and restore as nearly as possible the unbroken basic airfoil profile. Since the best high lift results have been realized with a multiplicity of slots combined with a highly cambered airfoil (sometimes called a cascade of airfoils), it will be apparent that to also harmonize such a structure (slots open) with what has been considered the most efficient high speed arrangement (slots closed), is a very difficult engineering problem at best—so much so that the best multiple slot high lift proposals (as determined by wind tunnel test) have yet to be reduced to full scale practical use.

It is clear that all high lift devices of the prior art have caused some increase in minimum drag (to greater or less degree) as compared with that of the basic airfoil, possibly some to a negligible extent, others to a prohibitive extent, but certainly it has not been previously claimed nor demonstrated that a reduction in minimum wing drag could be achieved with the same aerodynamic device used to obtain substantially increased lift. Such high lift developments have thus not extended aircraft speed ranges proportionately to that suggested by consideration of the lift improvement alone. All high lift devices share, in common, greater structural complication and consequent increased specific wing weight, but compensation is had through reduced wing area. Several promising arrangements from the high lift standpoint have unfortunately caused excessive adverse pitching moments, particularly where increased wing area is obtained by rearward chordwise extension with some sort of flap, thereby necessitating oversize horizontal tail surfaces to give a large counteracting download which accordingly penalizes total lift by a like amount.

In addition to the quantitative limitations of conventional airfoils as to the optimum attainable values of minimum drag and maximum lift which determine the available speed range and economy to be had for any given design, wings of the prior art have further restricted the all-round utility of the airplane from the standpoint of the qualitative flight characteristics, more particularly those affecting safety at slow speeds. Since maximum lift has been obtained at or just prior to the stall (such phenomenon of necessity terminating any further lift increase) it is obvious that the subsequent loss of lift and thus flying speed (and frequent falling off into spins) followed by sudden loss of altitude to regain speed, offers unanswerable evidence that the present airplane is inherently unsafe when flying at minimal speeds in proximity to the ground. Thus, a naturally desired and often critically necessary maneuver, as in approaching for landing or navigating in conditions of poor visibility, is the very thing to be avoided if one is to attain a reasonable degree of relative safety through skillful piloting technique—it is important to recognize that safety so realized is not inherent but depends, rather, on the human element which is fallible. It has been pointed out that modern airfoils, in general, have more critical stall characteristics and to that can be added the observation that high lift devices have usually very much aggravated the disadvantageous effects of the phenomenon, though to notably less degree where the wing slot of the prior art has been used. Since the highly disorganized flow occurring at the "stall" characteristic of the separation and break-away phenomenon, is a condition of extreme flow instability, it is not surprising that it is very difficult, if not impossible, to design an airplane having inherent stability in the stalled flight range. By the same token, as is well known to those skilled in the art, providing adequate and satisfactory control for a stalled airplane is also an elusive problem. It is unfortunately true then that from the standpoints of precipitous loss of flying speed and stability and control considerations, airfoil developments of the art in recent years have contributed in general, to fundamentally less safe flight characteristics at the lower end of the speed range.

The difficulties pointed out above regarding the limitations of conventional airplanes as to minimum drag and maximum lift and the instability associated with the latter, are due to certain functional faults inherent with wings of the prior art (including high lift devices) arising from critical flow phenomena which must be avoided, within the flight range, if fundamental improvement is to be had. These critical flow phenomena are inevitably concomitant upon the use of all aerodynamically energized fixed airfoil means so far devised to generate lift, the latter being, after all the primary object of any airfoil.

It is only in recent years that aeronautical engineers have shown any appreciable concern over the high drag of the turbulent boundary layer, for the advent of aerodynamically clean designs and consequent high speeds has so altered what was formerly a minor annoyance as to cause it to become a major obstacle to further improvement. Since air is a viscous fluid, the flow will fall from free stream velocity to zero velocity as the solid surface is approached—the layer including this velocity gradient extending from the surface to the level where free stream velocity obtains, being called the boundary layer. As the boundary layer is of shallow depth relative to the dimensions of the airfoil the change from free stream velocity, particularly near the surface, is very abrupt and it will be at once apparent that the potential source of friction between adjacent strata of air is considerable although the actual friction developed varies between wide limits in accordance with the laminar or turbulent character of the boundary layer.

In the full scale operating range of Reynold's numbers the flow over the surfaces of airfoils of the prior art is initially of the purely laminar form in the boundary layer, but at some point downstream on both upper and lower surfaces it degenerates to the turbulent state, though a very thin sub-laminar layer remains adjacent the surfaces. This fundamental change in boundary layer character is known as the transition phenomenon and the several factors influencing its occurrence set up an extremely critical relation. This can be better appreciated from consideration of the Figs. 1, 1a, 1b and 2.

Figure 1:
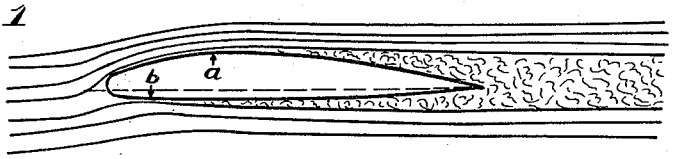
Figure 1A:
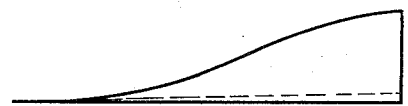
Figure 1B:

Fig. 1 shows a typical conventional wing operating in the high speed altitude (+2° angle of attack) and the regions over upper and lower surfaces where transition from laminar to turbulent flow initiates (indicated by arrows a and b respectively) and schematically shows as well the relative depth and extent of the respective boundary layers over the surfaces. The latter is more clearly indicated in Figs. 1a and 1b which plot the proportionate depths of the boundary layers over upper and lower surfaces, respectively, the sub-laminar layer being indicated by the dashed line. The higher the speed of the flow, the thinner the boundary layer (up to the compressibility burble) as its thickness, adjacent any position on the surface, is inversely proportional to the square root of the speed. This is significant, since the total drag incurred up to any point on a surface moving through a viscous fluid is nearly proportional to the depth of the boundary layer at that point—the high drag due to the turbulent layer is immediately apparent as will be understood by inspection of Figs. 1a and 1b. But the transition point moves forward with increasing Reynolds numbers, thus increasing the proportion of turbulent to laminar layer. The net effect of decreasing boundary layer thickness and relative increase of the turbulent part, with increasing airfoil size or speed is to reduce minimum drag coefficients as Reynolds numbers are increased.

Figure 2:
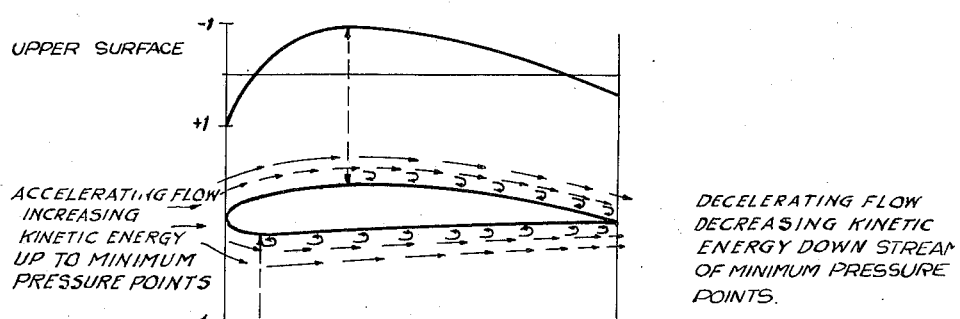
Fig. 2 represents schematically the pressure distribution over the surfaces of the airfoil of Fig. 1.

Fig. 2 shows diagrammatically the pressure distribution over the airfoil of Fig. 1 at the same air speed and angle of attack (+2°), the variation of the latter factor, of course, affecting the points of transition, that on the upper surface moving forward while transition over the lower surface retreats towards the trailing edge as incidence increases. Airfoils of unusual shape or arrangement might well vary somewhat from this general rule. It will be noted that transition occurs approximately at or somewhat downstream of the points where decreasing pressure reverses to increasing pressure. Laminar flow becomes unstable in regions of rising pressure—decreasing pressures being determined by accelerating flows and rising pressures by decelerating flow. Thus turbulence has its inception at that point where the local stream begins to lose velocity—it should be understood that the flow may travel an appreciable distance downstream before turbulence becomes fully developed, thus giving rise to the expression, transition region. It is self-evident that within a falling pressure gradient each point downstream has a progressively lower pressure, thus inducing the flow to accelerate in the same direction and remain laminar. In a rising or retarding pressure gradient, however, we have the opposite condition wherein points upstream are of progressively lower pressure, thus inducing the flow to decelerate and reverse direction in seeking to reach the regions of lower pressure. Acceleration and deceleration of the flow over the surfaces is schematically suggested by the relative lengths of the rearwardly directed arrows about the airfoil of Fig. 2, those adjacent the surfaces indicating the general tendency only of the random kinetic energy or directionally disorganized turbulent flow to move forward against the main flow stream toward the transition points, the laminar flow upstream therefrom, on the contrary, having directional stability. The complementary relation between increasing kinetic energy with falling pressure at the surface and decreasing kinetic energy with rising pressures, indicated by the pressure diagrams and velocity vectors of Fig. 2, will be observed.

When the rate of change of decreasing kinetic energy to increasing pressure energy exceeds a certain critical value, the flow reversal potential attains sufficient magnitude to unbalance the dynamic stability inertia of the local stream with consequent disorganization of the laminar flow to the turbulent state accompanied by a sharp rise in the energy loss incident to the velocity-pressure conversion which manifests itself as greatly increased boundary layer friction. It should be clear then that when this loss in the energy conversion cycle approaches the critical value, additional kinetic energy must be imparted to the local stream at such points, or the dissipated energy (friction) withdrawn from the flow, if the critical transition phenomenon is to be avoided—essentially a flow control problem.

The plain wing, functionally equivalent to a flat plate, is an essentially crude dynamic energy converter which divides the flow over the entire extent of the airfoil as it presents to the airstream either dissymmetry of form or inclination, or both, to give unequal division of the flow and consequent velocity differentials, thus inducing a statical pressure difference between upper and lower surfaces—it is characterized by a construction in which a movement is obtained by the difference in two motions in the same direction, or in other words, differential flow. Impact of the flow on the leading edge and the angular displacement directly or indirectly resulting therefrom decelerates the stream over a considerable portion generally ahead of the airfoil (the deceleration region increasing in extent and moving downwardly and rearwardly with increasing incidence) with consequent conversion of the kinetic energy of the flow to a corresponding increase of static pressure throughout this deceleration or "stagnation" region. Such impact energy conversion being substantially complete at the theoretical stagnation point accordingly gives high positive leading edge pressure. This excess pressural energy (super atmospheric) at the leading edge will naturally seek the regions of lower pressures on either side of the stagnation point, thus dividing and imparting acceleration to both upper and lower flowstreams with correspondingly augmented kinetic energy from a reconversion of stagnation pressure energy. Further, it is functional in fluid dynamics that surfaces curved into or crowding the streamlines will cause convergence of the local flow lines with consequent acceleration imparted to them while surfaces curved away or retreating from the streamlines will cause local flow line divergence and deceleration.

These velocity differentials which are a function of the airfoil shape and its inclination to the airstream induce corresponding pressures at the surface in accordance with Bernoulli's laws of fluid flow, after allowing for the loss of energy or friction head (incident to the velocity-pressure conversion cycle) arising from the viscous nature of air. When the stream flows along a path curved away from the flow (as over most of the upper surface, such curvilinear relation increasing with incidence of the airfoil) it tends to leave the surface due to centrifugal force, but is restrained by the impressed force of the atmosphere. When curved towards or impinging on the surface (as at the leading edge in the stagnation region and over the lower surface to an increased rearward extent with greater incidence) centrifugal force throws it against the surface with resultant pressural reaction. Centrifugal force acting away from the surface, unbalances the static pressure of the atmosphere at the surface, thus creating a region of low pressure. This low pressure region at the surface will drop to lower values as acceleration increases the local velocity and thus the outwardly acting centrifugal force, and will rise to higher pressures when centrifugal force is lessened by deceleration. Thus increased values of lift call for relatively greater acceleration over the upper surface and decreased velocity or deceleration over the lower surface with uninterrupted maintenance of such dynamic energy conversion. Unfortunately, the conventional airfoil of the prior art completely fails in this latter respect at relatively low values of maximum lift, due to the separation phenomenon more commonly known as the wing stall.

Figures 3, 4:
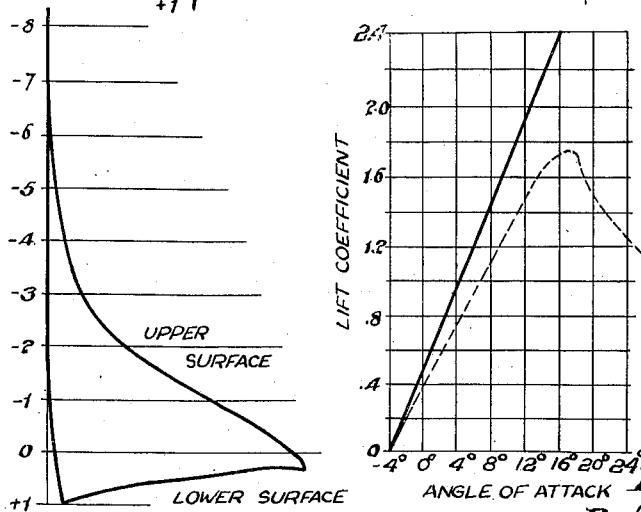
Fig. 3 represents schematically the pressure distribution over the surfaces of the airfoil of Fig. 1 at a changed attitude, illustratively in a low-speed, high-lift attitude of +16° angle of attack.
Fig. 4 represents a further schematic disclosure of the theoretical lift coefficient increase of the airfoil of Fig. 1 as its angle of attack increases in an ideal non-viscous fluid, while the dotted line indicates the actual lift curve typically attained in practice for similar changes of angle of attack.

In Fig. 3 we have the very much altered pressure distribution diagram in contrast to that for the same airfoil, shown by Fig. 2, in a low speed-high lift condition (+ 16° angle of attack). The tremendous increase in the rate of pressure change over the upper surface and the sudden reversal from accelerating to decelerating flow at the leading edge (as indicated by the regions of falling and rising pressures, respectively), is in startling contrast to the moderate velocity-pressure changes for the same wing in the high speed attitude. But, as previously pointed out, even the relatively low rate of flow deceleration for the latter condition (Fig. 2) is accompanied by the transition phenomenon, the turbulent boundary layer therefrom partially reversing direction in a disorganized attempt to flow upstream to the regions of lower pressures. As is well known to those skilled in the art, this eddying backwash over the upper surface attains substantial proportions at the higher angles of attack with corresponding thickening of the turbulent boundary layer and thus, to mention one undesirable attribute, results in greatly increased wing drag. The upper surface transition point moves forward almost to the leading edge just prior to the stall and it will be observed that the pressure potential (in this region) inducing upstream flow is very large indeed. This progressively augmented reversal of the flow in the boundary layer, increasing with incidence, obviously directly opposes and disrupts the ideal rearward course of the free stream along the surface—further promoting deceleration and loss of kinetic energy with consequent reduction of upper surface negative pressure and thus lift. Kinetic energy losses over the upper surface are detrimental to lift as well as drag. Since no further energy conversion means are provided by the conventional airfoil to control kinetic energy losses, a critical angle of attack (15° to 20° for the average airfoil) is soon reached where these flow reversal de-energizing forces attain sufficient magnitude to unbalance the dynamic stability of the forces generating controlled rearward flow and thus lift over the upper surface. At this point increased incidence or the slightest irregularity in the flow stream, or the surface of the airfoil, or the least sudden movement or vibration, will precipitate the stall, i. e., precipitous wire angular separation and breakaway of the main flow stream from the upper surface near the leading edge the main flow being literally impelled therefrom by the excessive force of the upstream backwash currents with consequent extensive dissipation of energy in violent turbulence or burbling flow which lacks sustained centrifugal force to maintain unimpaired lift by repulsion of atmospheric pressure from the surface.

The stall, then, terminates the lift increase of any airfoil or in other words, the lower velocity limit for any given design is accordingly determined thereby. While the sudden loss of lift (and thus flying speed), characteristic of the stall, is well understood, it is not so generally recognized that the increasing loss of upper surface velocity, prior to the separation phenomenon, also seriously penalizes lift (as well as drag) in the upper ranges of incidence (lower speeds). A glance at Fig. 4 gives an idea of what this loss of lift may amount to in the case of the conventional wing previously under discussion. The solid line shows the theoretical increase of lift coefficient with angle of attack for a wing in an ideal non-viscous fluid as contemplated by Bernoulli's theorem. The dashed line plots the typical lift curve actually realized in practice—the discrepancy between the actual and the ideal is at once apparent, the latter giving some 40% greater lift near the angle of maximum lift. The finality with which the separation phenomenon so abruptly lets the bottom fall out of the lift curve, so to speak (at 18° stalling angle in this case) offers further convincing proof, if any be needed, of what an unsatisfactory dynamic lifting device the airfoil of the prior art is. It is also interesting to note that the degeneration of the flow due to the inherent transition phenomenon of the plain wing results in a not insignificant loss of lift even for the high speed-low angle of attack range though we customarily think only of the drag penalty for this condition. Attainment of higher values of lift and elimination of the stall within the normal flight range depends essentially upon the addition of sufficient kinetic energy to the upper surface flow at such points and to the extent required for avoidance of the separation phenomenon—here again, a fundamental flow control problem.

It is an object of this invention to delay the occurrence of, or entirely eliminate, the phenomena of transition and separation by appropriate means primarily energized aerodynamically to give inherent control of the flow over the airfoil throughout the usefully attainable flight range. In what is presently believed to be the preferred embodiment of the invention, these means comprise some or all of the following elements; a stagnation slot, a permeation passage, a movable leading edge slat section, an intermediate relatively fixed main airfoil portion and one or more rearwardly disposed movable sections or flaps terminating at the trailing edge, the several components combining to form a basic airfoil profile. Certain forms of the invention, according to desired conditions, further provide that some or all of the movable sections which are effective to give a variable camber airfoil are so constructed and arranged as to control airfoil camber variation automatically aerodynamically, selectively manually, separately or in combination and an additional feature provides resiliently variable camber control. Preferably the airfoil of this invention is somewhat similar in general high speed attitude outline to those of conventional type, but, as will be appreciated by those skilled in the art as the description of the device unfolds, having radically different functional characteristics productive of new and important results which the prior art has so far failed to achieve.

The rearwardly disposed flaps are joined by successive articulation to each other and to the rear of the relatively fixed section of the airfoil, approximately at their respectively adjacent lower surface extremities—piano type hinges offer one suitable means of securing such pivotal joints—thereby providing for relative angular deflection of the several flaps through a preselected range as determined and controlled by suitable interconnecting operating mechanism. This articulated arrangement permits of a substantial increase in wing camber and thus, in combination with the other features giving controlled airflow over both upper and lower surfaces of the airfoil, results in optimum energy conversion ratios (velocity and pressure differentials) for maximum values of lift and also, by concurrently increasing incidence of the wing relative to that of the airplane, makes available a large range of lift coefficients within a relatively reduced range of ship pitching angles. The several components of the articulated system shall be dependently operable and may be aerodynamically balanced through interconnection with the automatic leading edge slot, or spring loaded, or actuated either manually or by power but are preferably automatically responsive to flight pressure changes so as to present to the airstream the optimum camber, incidence and flow control passages for each speed through the flight range without attention to, or the need for adjustment of, lift control devices on the part of the pilot, except during landing and take off maneuvers if desired. Such articulated sections may be so designed as to give partial aerodynamic balance of each flap individually for reduction of operating loads. It is further contemplated that the trailing edge articulated flap (or a separate flap may be used to accomplish substantially the same result) will include means for separate and independent operation actuated by the pilot to further depress said flap well beyond the angular range of the automatic system. An object of the latter arrangement is to make available to the pilot, control of glide path angles and increased values of lift, without excessive pitching angles of the airplane or wing, for the flattening out maneuver with reduction of speed just prior to contact when landing. Substantially the same result may be achieved, indirectly actuated by the pilot through operation of the airplane's longitudinal control, by spring loading such trailing edge flap to give maximum down movement thereof with reducing air speed and thus lowered flight pressure air loads on the flap as the elevator is raised through the full extent of its upward travel. Independent operation of the trailing edge flap, or an outboard spanwise portion of it, can also be used to provide lateral control means for the airplane, if desired. Should further aerodynamic balance be necessary for any given articulated flap system, it may be provided in generous measure by reversing the mechanical linkage interconnecting the trailing edge flap with the next forwardly disposed flap so that the former will deflect upwardly, thus acting as a balance tab, as the intermediate articulated sections are deflected downwardly—such trailing edge flap could still be independently operated as previously specified. The trailing edge reverse camber airfoil sections so obtained might further be advantageous, aerodynamically, in providing relatively high lifts with good lift to drag ratios for the take-off and climbing range. It may also be desirable in certain installations, and optional provision of such comes within the scope of the invention, to provide suitable mechanical means actuated and controlled by the pilot to selectively limit the operating range of the automatic variable camber wing system so that a considerable range of landing speeds extending upwardly from the normal minimum is made available in accordance with the predetermined maximum lift chosen by the pilot—a feature which would be particularly useful for the landing of lightly loaded airplanes with high winds prevailing. A further mechanical feature can be included in the articulated flap operating mechanism, comprising a compressible or extensible link, resiliently preloaded by spring, pneumatic hydraulic or other suitable pressure actuating means, interconnecting the articulated system with the leading edge slat, or a plurality of such links can be used, one as above and one each forming part of the connecting mechanism between adjacently disposed flaps, such links to be adjusted for controlled amounts of extension or compression when acceleration or vibration imposed overloads on the wing, whether imposed voluntarily or involuntarily, exceed some predetermined limit such as 2G or 3G or any other desired value greater or less than the normal load on the wing during straight-away constant speed horizontal flight. It will be observed that this will permit the articulated system, independent of the leading edge slat, to assume an attitude of negative wing camber and incidence and thus lift, thereby "spilling" the excess energy imposed on conventional rigid type wings by a sudden pull up from a dive or steep glide or the severe up-gusts encountered in conditions of rough air. Also, and conversely, the wing will assume an attitude of positive camber and thus similarly tend to avoid large down-load accelerations from gusts or other causes. Since the designed load factors for the wing can never be exceeded with this resilient type of structure, the factor of safety strength provided by the latter can be designed to closer tolerance limits thereby effecting an important saving of weight. There is the further advantage that for normal speeds and extending up to the terminal velocity of the airplane, a correctly balanced response of the resilient structure will damp out and thus avoid development of any critical vibration period, leading to the highly dangerous wing flutter condition with consequent almost instantaneous disintegration of the structure—a very critical problem, successful solution of which is difficult with presently used rigid wing structures operating at relatively high speeds. It is better engineering practice to resiliently balance out stresses and strains than to add weight for increased structural rigidity in the hope of providing sufficient strength to resist or overcome such forces, the latter palliative often having the unfortunate effect of accumulating undesirable forms and amounts of destructive energy in the structure.

The leading edge slat is mounted for movement or may be fixed with complemental slot closure means, in any desired manner whether by a pivot, linkage, or an extensible shaft as shown, so long as it is capable of opening to form a leading edge slot. It is generically designated as an articulated section of the airfoil.

The automatic operation of the movable leading edge slat, opening to form a wing slot between the slat and the leading edge of the fixed portion of the wing, actuated by the forwardly inclined resultant pressure on the slat prior to attainment of the critical angle of attack on the main wing and closing, in turn, with a rearwardly inclined resultant force on the slat, as wing incidence is reduced to a higher speed attitude, is old art. It has also been shown by wind tunnel pressure distribution tests that this slat actuating force is of considerable magnitude, as has been further demonstrated in flight with several airplanes utilizing a movable leading edge slat interconnected with a trailing edge flap, the latter being thus automatically depressed by the former as flight speed is reduced in the minimum range.

The preferred embodiment of this invention proposes a similar mechanical interconnection of the movable leading edge slot and the articulated rearward sections of the airfoil for automatic or manual dependently coupled actuation. While experience to date may suggest that any airplane equipped with the wing of the present invention should have a mechanical interconnection between the right and left hand articulated wing systems, either side of the longitudinal axis of the airplane, for simultaneous and dependent operation, it is desired to point out that observation of natural flight has revealed instances of birds so controlling their wings as to effect increased relative lift on the inside wing in a turn, in contrast to the reversal of such span-wise unbalanced lift distribution with man's mechanical aileron means of lateral control so far employed. Since the wing system herein disclosed would obviously preclude sudden opening or closing of the leading edge slat or change of wing camber and incidence, but rather a gradual and smooth variation of the relative disposition of the wing components, and thus lift, over a considerable range of speed, it is believed that flight experience with the invention will disclose a harmonious accommodation of the structure to the functions evolved by Nature. This invention accordingly specifically contemplates the option of providing separate and independently controllable right and left hand articulated wing combinations, or a spanwise plurality of such wing combinations, each such combination automatically responsive only to such variation of pressures as it alone encounters in flight. In such a case, the relatively retreating wing in a turn would assume a position of increased camber and relative lift. It is a further essential object of this invention to so design and construct the leading edge slat and its operating gear as to secure aerodynamically effective integration with the basic airfoil upper surface leading edge profile when the slat is fully closed, thus avoiding interference with laminar flow over this part of the airfoil surface in the normal high speed operating range.

As the name implies the stagnation slot constitutes an opening in the airfoil, or what might be called a divided or dual entry airfoil, such slot inlet located where the main stream entering flow decelerates, impinges upon and divides to flow over both surfaces of the leading edge, thus building up high stagnation (or super-atmospheric) static pressure in this region. If a properly proportioned stagnation slot simply communicated with a closed chamber, the leading edge flow phenomena would be substantially the same as though it were a conventional unbroken profile airfoil, as will also be the case when exit passages and pressures are such as to give a relatively low volume inflow rate. In the unique and what is believed to be new combination of the several flow control elements of this invention and their variable disposition relative to each other automatically responding to changes of flight speeds and pressures, a highly beneficial and efficient application of aerodynamic energy throughout the lift range of the airfoil has been achieved, one characteristic of which is evidenced by the relatively low volume inflow rate at the stagnation slot in the high speed-minimum drag range and the conversely obtaining relatively large volume inflow rate through this same slot for the low speed-high lift altitude of the airfoil. It will be convenient for design purposes as it is furthermore desirable from the standpoint of keeping internal velocities and thus frictional losses within the forward part of the airfoil down to minimal values, to diverge the internal chamber aft of the stagnation slot entry along the lines of the main surfaces of the airfoil, which may in fact also constitute the internal chamber boundary walls in the fixed section of the airfoil, in general. This will secure such extremely low internal velocities in the high speed range (most of the energy within this part of the chamber being in the form of high static pressure) that no appreciable impediment to the flow or sacrifice of efficiency, for all practical purposes, will be offered by any conventional open girder or stressed skin type of box spar for the main support of the wing system against all resultant bending, torsional and sheer stresses. If the initial divergence within this internal passage should exceed the critical limits (7° to 10° included angle) for efficient velocity-pressure energy conversion without flow separation, this can be very easily remedied in the design by providing one or more diffuser vanes to give correct angular divergence, as required. When a leading edge slat is used in conjunction with a stagnation slot the two will necessarily be adjacently disposed, with the former in the closed position, for which condition the leading edge of the slat may serve the dual function of forming the upper surface leading edge of the high speed airfoil section and also partly form the upper and forwardly disposed entrance surface of the stagnation slot. The particular form, size and location of the stagnation slot naturally depend upon and must be accommodated to the detailed design and aerodynamic characteristics of any given airfoil to which it is to be applied, the principal requirements being to provide unimpeded transfer of substantially full free stream impact, or flight induced ram stagnation pressure, energy at the leading edge to the interior of a selected part of the airfoil, such pressure communication to be so harmonized with high speed relatively low velocity inflow as to give a divided entry airfoil having leading edge flow phenomena of comparable efficiency with or even superior to that attained by conventional closed contour profiles, particularly in the high speed-low angle of attack range. An important effect of this rather unusual airfoil arrangement is that instead of allowing the high stagnation pressure to react, largely in a downstream direction, on a closed leading edge surface, thus creating pressural drag, it is taken internally by part of the airfoil and utilized to aerodynamic advantage, the reduced stagnation pressure externally available consequently modifying precipitous velocity-pressure changes over the dual leading edges, thereby deviating laminar flow transition tendencies in the more rearwardly disposed leading edge region over the lower surface at low angles of incidence (high speed).

In general, the lower surface of the intermediately disposed articulated flap or flaps shall consist of pervious material or intersticed structure exposing permanently open air inlet passages which shall be of such size and shape in relation to the kinematic viscosity of air as to give controlled permeability under certain selected flow conditions. Proceeding downstream from leading to trailing edge of the airfoil, this means then that the conventional lower surface, impervious to air, will change to the pervious type, usually somewhere in the neighborhood of 50% of the wing chord, since the first flap will usually be articulated to the fixed portion of the wing at about this point on the lower surface. The lower surface, a relatively short distance upstream from the trailing edge of the airfoil, will again revert to the impervious type and it will usually be convenient and aerodynamically sound practice to effect this latter change in surface structure at that point on the lower surface where the trailing edge flap is articulated to the next forwardly disposed flap. Thus the trailing edge flap will normally be of the conventional impervious surface closed profile type. It is also anticipated that with some airfoil profiles or for certain conditions of operating Reynold's numbers it will be necessary, in order to realize optimum flow efficiencies attainable with this invention, to extend the pervious surface a substantial distance forward, upstream from the 50% chord point, to include, in cases, part of the lower surface of the fixed wing portion, which latter feature can be readily fitted in with what is presently believed to be the preferred arrangement of the internal energy conversion flow passages. On the basis of tests conducted up to the present writing it is impossible to specify which one of the many possible number of ways and means might best be employed to obtain the pervious surface of the desired character, extending all the way from a simple perforated sheet, mesh type non-hydroscopic fabrics or screens, to intersticed slots approximately normal to the flow lines but edgewise angularly disposed thereto, preferably at about 45°, to secure smooth "wiping" action over the main stream. In any case, whatever the material or the construction or arrangement of this special type portion of the lower wing surface, it shall be effective to so function under operating conditions as to be substantially impervious to air flowing relatively parallel thereto, but to become permeable as the flow impinges angularly thereon, such latter effect increasing with local flow incidence to give optimum permeability to airflow normal to the surface, as for instance may be the case with the characteristic directionally in discriminate turbulent boundary layer flow. The size of the pervious inlet openings shall be harmonized with the kinetic viscosity of the airflow.

In view of lower surface articulation of the compound flap system and the fixed wing portion, their upper surfaces will accordingly be telescopically associated and spaced overlapping structural entities having relative longitudinal travel with change of wing camber. In what is presently believed to be the most practical embodiment of the invention, the trailing edge of each upper surface segment, including that of the fixed portion, forwardly disposed of a flap, shall overlie the upper surface leading edge portion of the adjacent downstream flap at all angles of flap deflection and shall normally be so spaced therefrom as to form a rearwardly directed air discharge passage having substantially the nozzle-like proportions of the conventional type of wing slot exit jet. Thus the slot exits may, illustratively in the light of current practice present an opening ranging from perhaps 1% of the wing chord, down to something appreciably less (in certain cases) for the minimum camber wing position (flaps neutral), increasing to similarly related openings of from 1% to 4% or somewhat more (depending on relative flap size and angular deflection) at maximum wing camber (flaps fully depressed). Control of such variable slot proportions depends upon well understood design factors relating the position of the overlying trailing edge and flap leading edge profile shape and location with respect to the disposition of the flap effective hinge point. In the particular arrangement of upper surface jets adjacent to and having their respective lower surfaces formed by the leading edge of each flap, as specified above, it is obvious that there is an equal number of such flaps and jets, the latter disposed at the upper surface approximately opposite (or slightly downstream of a line normal to the wing chord and passing through) the respective flap pivotal points but there is no intention to imply that the invention should be limited to such numerical relationship or disposition of flaps and jets. On the contrary, the preferred embodiment, would dispose of the articulated flap system and substitute therefore a resilient wing rib functioning to give similar automatic camber control and having the upper surface adjacent thereto comprised of multitudinous overlapping slats or vanes forming wing slot exit jets, or having such upper surface portion formed by a special material so fabricated as to give the same aerodynamic function (rearward high velocity air discharge along the surface). Even with the presently proposed articulated flap system, certain desirable modifications provide more than one slot exit jet per flap, either disposed longitudinally along the chord of the flap or in some cases forming a plurality of superimposed jets at approximately the same chordwise location. One important distinction from the wing slot of the prior art intended for high performance aircraft resides in the fundamental specification of the present disclosure that at least one, or preferably a plurality of the upper surface slot discharge jets shall remain permanently open for all camber positions and incidence altitudes of the wing, not because it is functionally desirable though structurally inconvenient to close same at normal flight speeds, but rather, on the contrary, is it essential that one or more upper surface jets be open and functioning in order to realize the important contribution of the device to the high speed economy of the airplane so equipped.

As will be readily understood by those skilled in the art, the stagnation slot, the pervious lower wing surface portion and the upper surface slot exit jets are all mutually interrelated structurally and dependent and complementary in their functioning. The pervious inlet surface communicates with converging passages extending across the wing from lower surface to upper surface, thereby giving access to generally transverse airflow therethrough and such passages must curve rearwardly as they lead into and form one or more of the slot exit openings discharging downstream into and in substantial tangential relation with the upper surface local flow. It is obvious that with any object, such as an airfoil, immersed in a relative fluid flow so as to give unsymmetrical flow displacement and thus velocity and pressure differentials between surfaces so inter-connected, that this inherent dynamically energized pressure difference will induce a flow through such passages from one surface to the other, the available pressure head and passage arrangement determining the discharge velocity. A wing slot is so convergently shaped as to facilitate conversion of the available flow energy, from lower surface pressure to upper surface kinetic energy and it follows that the resultant slot discharge velocity will not equal that of the local external stream, unless its energizing pressure potential is of the correspondingly required magnitude. The wing slot of the prior art and the transverse flow passage of this invention so far considered, lack this required pressure potential in the low incidence (high speed) range of the airfoil, thereby resulting in a loss of kinetic energy adjacent the slot exit, with corresponding increases of upper surface drag and pressure and thus decreased lift giving the customary less favorable slope of the lift curve with the conventional wing slot. While the specified flow passage can be considered to be an application of the wing slot flow energy conversion principle, it does introduce a radically new means for securing functional refinement of entrance flow phenomena through use of a multiplicity of pervious inlet openings (in contrast to the conventional single gap slot entrance), which momentum loss drag surveys (wind tunnel tests) have shown to be effective in reducing lower surface high speed drag, while that over the upper surface was greater, as would be expected with this arrangement. This decrease of lower surface boundary layer drag has been achieved by controlled permeability for the selected minimum camber—low incidence—high speed flow condition over the lower surface of the airfoil. Assume, for illustrative purposes only, that the pervious air inlet passages begin at a spanwise line along the wing somewhat downstream of where transition from laminar to turbulent flow has occurred over the lower surface. The directionally indeterminate progress of the flow within the turbulent region will accordingly engage the pervious surface at practically infinite angular relation thereto and in view of the energizing pressure potential across the open passage through the airfoil, that surface will be permeable for that flow condition. Thus will the turbulent boundary layer and its dissipated energy content (friction), or some part of it, be inducted into the internal flow control passage of the wing which action will, in turn, inevitably draw the free stream flow (outside the boundary layer) towards the external lower surface of the airfoil. Since slot exit velocities are a function of the available pressure difference, the volume flow rate will be determined and can therefore be controlled by the size of the slot exit opening, from which it will be apparent that inflow at the lower surface can be adjusted to various volume flow rates— total inlet areas will in any case exceed total exit areas, greatly so for the high speed condition, thus giving relatively low inflow velocities. The desired inflow will obtain with that flow passage adjustment which is just sufficient to give continuous seepage withdrawal of the lower surface boundary layer as fast as it forms in the turbulent state, or preferably just prior to occurrence of the transition phenomenon. This, then, will bring the free stream into close proximity with the external surface and the two will be separated only by a laminar, or predominately laminar, boundary layer having characteristically low viscous (or friction) drag coefficients. But, it is important to note that with the specified flow control adjustment for the given high speed conditions, the permeable surface will be and for all practical purposes is impervious to the main flow adjacent to and substantially parallel with the lower surface, since volumetric inflow limitations will prevent any appreciable intake of the main stream. The combination of the flow control passages with the special type of pervious surface is accordingly effective to discriminate, so far as lower surface flow is concerned, between detrimental and favorable flow phenomena, largely disposing of the former while yet maintaining the latter substantially unaltered, i. e. the resultant distribution of pressure (lift) over the surface, will be substantially the same. For the ideal condition, which the preferred arrangement should be designed to realize, the pervious surface shall be extended upstream, forward of where a transition point would otherwise obtain, into the region where the laminar flow begins to develop the characteristic transition instability, prior to degeneration into turbulent flow, the boundary layer downstream therefrom comprising, at the worst, no more than this sinuous laminar wave removed through the pervious surface as and where it develops, the pervious surface again terminating upstream from the trailing edge where the flow will in any case continue in the laminar state substantially throughout its remaining path of travel along the surface. These optimum relationships of pervious airfoil surface and connecting flow passages controlling lower surface laminar flow, are those which the invention is intended to give (with proper design and construction of the device) for that speed, or speed range, where the greatest flight economy is desired.

The complementary function of the stagnation slot in relation to the pervious portion of the lower surface and the upper surface jets, and its primary object, is to add sufficient energy to the local flow over the upper surface and directly or indirectly, to the transverse type flow control system, to supply the deficiency in pressure potential energizing the latter in the high speed range of the airfoil, thus giving slot exit velocities at least equal to, or preferably exceeding and thus augmenting the kinetic energy of the upper surface local stream. Structurally, this is achieved by continuing the high static pressure preferably divergent chamber, downstream of the stagnation slot entrance, into a convergent passage also disposed internally, or a plurality of such passages, terminating in one or more slot exit jets, similarly disposed, directed and proportioned to those of the transverse flow passages along the upper surface of the airfoil, in its after part, in general. It will be observed that air entering the stagnation slot will flow through the wing in a generally longitudinal direction and since the pressure difference across the longitudinal flow control system (between high positive stagnation pressure at the leading edge and the low pressure region over the rearwardly part of the upper surface) is considerably more potent than that inducing airflow through the transverse type, the former will accordingly be productive of higher kinetic energy jet discharge flow relative to that attained with the latter (otherwise unassisted). Going downstream over the upper surface the slot exits will be located in the region where a rising pressure gradient (decreasing kinetic energy) would normally obtain and the first such exit, or group of exits, may communicate with the longitudinal stagnation slot system, while the remaining jet, or jets, are those of the transverse arrangement, each sytsem to be internally separate and independent in this case. The smoothly accelerating flow from the first group tangentially laminates with the decelerating external local stream, thus merging the energy of the two streams with consequent relative increase of upper surface local velocity and corresponding decrease of pressure, the augmented high velocity-low pressure energy relation continuing downstream to effect a greater pressure potential across the transverse flow passages and thus increased discharge velocity therefrom. This constitutes one method of externally, or indirectly, adding energy from the longitudinal flow control system to that of the transverse type. Another indirect method would reverse the above arrangement, the respective internal ducts of necessity providing for crossed, but non-communicating, flow, so as to give transverse jet discharge forward of that from the rearwardly disposed longitudinal type, thus "sandwiching" the former between the high kinetic energy of the latter and that of the free stream over the upper surface. On the other hand this energy exchange may be more directly accomplished by means of induction type, or jet augmentor slots, respectively internally discharging, either the transverse or the longitudinal flow, but usually in close proximity to an upper surface jet, the principle involved simply requiring such proportionment of the internal ducts that the higher energy content of the longitudinal flow will be largely in the form of kinetic energy (thus having reduced pressure) at that point where it merges with and adds energy to induce or augment the transverse flow discharge. From the foregoing discussion it will be clear that the contribution of kinetic energy from the slot exits to the upper surface flow obviously effects a redistribution of velocity and thus of pressure over the surface. In the preferred embodiment of the invention, the jets are so disposed over the upper surface, in relation to the design characteristics of the airfoil, that their varying energy content will give a favorable falling pressure distribution over the surface conducive to maintenance of laminar flow. But the prior art has demonstrated that it takes more than a falling pressure gradient to continue the flow in the laminar state with full scale airplane wings at operating Reynold's numbers and Reynolds, himself, proved many years previous, through his studies of fluid flow in pipes, that as velocity increases the lineal extent of surface over which the flow will remain laminar is correspondingly reduced. This functional insufficiency of the aerodynamically smooth surfaced conventional airfoil, will be largely controlled or eliminated with the optimum number and spacing of the special type interrelated upper surface jets of this invention having correct discharge velocities and volume flow rates, which are effective to inject accelerated streams of new flow into the local stream at those points where unstable laminar flow waves are developing and will thereupon be damped out as the added kinetic energy is absorbed and distributed through the boundary layer to the main stream. Thus we break the upper surface up into a series of segments having their lineal extent adjusted to fundamental fluid flow laws and each receiving a fresh supply of flow energy to compensate for that dissipated over the respective forwardly disposed airfoil segments. In such way will the re-energized flow cooperate to maintain a laminar, or predominately laminar, boundary layer over the upper surface substantially throughout its full extent. As with the pervious lower surface, it will be readily apparent to those versed in aerodynamic fundamentals that all design factors for the upper surface jets relating their proportions, size, number, spacing, etc., to any given airfoil, must not only take account of the functional characteristics of the airfoil itself, but also the size of the wing to be used and its operating speed range. Since transition over the surfaces moves forward towards the leading edge with increasing Reynold's numbers, so will the upper surface slot exits similarly tend to be more forwardly disposed with a greater number of jets more closely spaced on the chordwise linear extent of the airfoil and by the same token the chordwise extent of the permeable lower surface will likewise be similarly increased. One of the more important objects of the invention is to circumvent the critical interdependence of transition on R. N. with respect to the flow over either surface of an airplane wing. Wind tunnel tests have demonstrated the validity of this longitudinal type flow control principle and the effectiveness of the system in discharging high kinetic energy flow into the upper surface boundary layer with consequent reduction of its drag and further, its beneficial complementary functioning with the transverse flow control system, as revealed by exploration of the wake downstream of the airfoil, to give reduced momentum loss over both surfaces of the airfoil and thus less total drag for the high speed condition than that attained with the same airfoil section having a conventional closed profile, a result not achieved by the prior art so far as known to the present inventor. This invention provides for the first time, then, a self reduced, or inherent, boundary layer control system giving correlated or integrated airflow over both surfaces of the wing and thus greater high speed efficiency (improved lift to drag ratios) than that attainable with the conventional simple airfoil. It is important to recognize that as wing section drag is reduced, wing thickness ratios can become greater without increasing the over-all drag of the airplane, thus realizing considerable weight economies with the relatively thick wings which would be feasible in view of predominately laminar flow.

With increasing incidence and camber of the airfoil the inherent flow control systems become highly effective in giving large aerodynamic energy conversion between upper and lower surfaces which tests have shown to be productive of relatively high values of lift for the slow speed range. As previously specified the slot exit gaps, underlying the upper surface traling edge segments, open up with deflection of the articulated flaps and in view of the accompanying large increase of inter-surface pressure differentials, relative volume flow rates and slot discharge velocities are greatly augmented, thus supplying a powerful increment of kinetic energy directed against and largely overcoming the eddying backwash tendency over the upper surface, for this condition. This quantitatively large addition of high kinetic energy to the flow, in turn, not only maintains but is of itself further effective to give a corresponding increase in negative pressure distribution over the upper surface and therein lies the fundamental distinction between flow control high lift devices and those which in no way mitigate the limitations of the conventional airfoil. Concurrently, lower surface flow phenomena is so altered as to develop a high degree of positive pressure resulting from the deceleration of the flow, incident to the highly cambered section assumed by the airfoil and its largely increased incidence without comparable change in pitching angle of the airplane, itself. The locally increased incidence on the pervious surface, combined with the greatly augmented pressure difference across the transverse flow passages, accordingly so modifies the functional effect of that surface as to then make it freely permeable for large volume inflow of the main stream. In order to assure that the jet discharge over the upper surface of each flap will curve with and follow that surface as wing camber is increased, no flap shall normally be deflected through an angular range of more than 30° to 35° relative to the forwardly adjacent flap or fixed wing portion, unless any such flap be provided with some means for further flow control as, for instance, the deflector plate covered by U. S. Patents No. 2,117,607 and No. 2,169,416, issued to the present applicant, in which latter case, flap deflections up to 50° with good flow energy conversion efficiencies may be obtained. For those applications of this airfoil system where it is desirable to secure further control of the critical separation phenomenon, the incorporation of a properly designed movable leading edge slot has proved highly effective to that end, also, incidently giving a further substantial increase in maximum lift and more favorable pitching moments from the standpoint of stability and control. With the best overall airfoil combinations so far tested, visual studies have clearly shown that the high energy flow control succeeded in preventing separation over any part of the articulated airfoil system up to relatively high angles of attack.

Further, force tests confirmed that maximum lift of the combination, on the other hand, occurs at a substantially lower airfoil incidence, comparable with stalling angles of conventional airfoils. This spread between the angle for maximum lift and that at which separation may occur is a factor of fundamental importance in relegating the wing stall safely outside the normal flight range or attainable flight attitude. Translated into terms of everyday practice, this means that an airplane can maneuver close to minimal speed, including the approach glide for landing, without danger of precipitous loss of flying speed or potentially destructive acceleration. The great value of the glide control flap during the landing operation, becomes apparent at this point for its full deflection is effective to further decrease the angle for maximum lift and thus the optimum required pitching angle of the ship at minimum speed, the increased lift and drag reducing forward speed and, initially, vertical velocity which is highly advantageous for smooth and easy landings. Thus does the integrated wing provide the essential requirements enabling avoidance of sudden occurrence of the highly unstable disorganized flow characteristic of stalled flight, which is elemental for inherent stability at minimal speeds and upon which the attainment of adequate and satisfactory control of the airplane depends.

Fundamental theory supports the basic flow control principles of this invention and test data indicates successful application of these principles in so integrating the available aerodynamic energy, inherent in heavier-than-air flight, as to substantially improve the control over the highly critical transition and separation phenomena, each within that speed range (and well beyond) where its otherwise normally functional occurrence exacts such a heavy penalty on the high speed economy and the slow speed safety of the airplane, respectively.

While a wing constructed according to the principles of this invention applied to a relatively lightly loaded airplane, of say 10#/☐ wing loading, would provide a rather remarkable slow speed performance permitting operation from very restricted areas, its minimum drag potentialities make it particularly attractive for the design of aircraft having far higher performance than has heretofore been attainable, with wing loadings of perhaps 60#/☐, or higher, economical cruising speeds in the 300 M. P. H. range or better, and landing speeds still within presently accepted safe limits for this class of airplane. For designs in this latter category, an essential and integral feature of this invention will include suitable means for directly utilizing the external energy available in the waste heat dissipated by the power plant of the aircraft (presently lost in most conventional airplanes, used to a minor extent by a few) to augment the high speed efficiency of the inherent, or aerodynamically energized, boundary layer control system, incidentally adding in certain cases some degree of jet propulsion effect to the primary functions of the latter.

One of the fundamental laws of thermodynamics concerns the mutual convertability of heat and work and as is well known, a crude heat engine, using air at atmospheric pressure as the fluid medium to transform externally generated thermal energy into useful mechanical work, was one of the earliest instances of applied thermodynamics. This interesting experiment, however, was so extravagant of energy as to have little practical value, since the efficiency of the cycle depends on the initial compression of the air prior to the addition of the heat energy (entropy decreasing as initial compression increases whether it be expansion at constant volume or constant pressure). It will be recalled that the "ram" effect due to conversion of the energy of relative motion of the aircraft develops super-atmospheric static pressure within the stagnation slot pressure chamber in the forward part of the integral flow airfoil. This flight induced internal ram compression or supercharge amounts to an inconsequential friction of an atmosphere at moderate flight speeds but in the higher speed ranges it becomes appreciable, giving effect to increases in pressure above atmospheric of about 4.8% at 200 M. P. H., 10.8% at 300 M. P. H. and 19.3% at 400 M. P. H., etc.

Since the very best of modern internal combustion aircraft engines have overall thermal efficiencies in the neighborhood of 30% and assuming about a 5% radiation loss, approximately 65% of the potential energy of the fuel accordingly dissipates (and is presently lost by conventional designs) as waste heat in the engine exhaust gases and cooling air (whether the engine be directly or indirectly air cooled). In the design category stipulated or where it is desired to heat the wings to obtain other useful effects or for any combination of the several possibilities, this invention provides for the use of engine cooling air or exhaust gas discharge ducts or both (a common duct can be used) extending from the engine, or engines, substantially throughout the full span of the wings, such ducts being so disposed within or communicating with the internal stagnation pressure chamber of the wing and having sufficient radiation surface as to primarily transfer the available heat of the contained gases to the air passing through the longitudinal flow control system of the airfoil. It should be obvious that it would not be difficult to obtain a substantially complete heat exchange by discharging the contained gases progressively along the span into the internal airstream—neglecting the effects of the added thermal energy, this would correspondingly reduce stagnation slot mass inflow rates and velocities. Further, the discharge of such gases may be effected in regions of reduced pressure, such as towards the stagnation slot exit, thus relieving back pressure in the thermal ducts and facilitating the flow of the gases therethrough. For some installations, however, it may be desirable to continue the waste heat gases through a closed duct system within the wing, discharging same externally to the aerodynamic flow control system in the region of the wing tips.

Since one incidental, but important, object of this heat transfer arrangement is to achieve anti-icing of the wing under the most adverse atmospheric conditions, one preferred disposition of the thermal duct will be along or adjacent to the leading edge of the wing, but wherever located preferably resulting in no more heat loss through the external surfaces of the wing than is just sufficient to preclude the formation of ice at any point, under any atmospheric conditions. Still another beneficial by-product of this heat exchange cycle will be rather effective and complete muffling of engine exhaust noises due to the very considerable cooling of the exhaust gases, an object of possibly greater military than commercial importance.

The primary object, however, is to preheat the air in the longitudinal flow passages prior to discharge out the upper surface jets. The coefficient of expansion of air per degree Fahrenheit is 0.002034 of its volume at 32° F., the pressure being constant and if the volume is kept constant, the pressure varies directly as the absolute temperature, both ratios thus being approximately equal for the stated conditions. Decreasing the density of the air by the addition of heat in the stagnation pressure chamber will expand the flow thus causing a reaction or back pressure, with corresponding increase of total pressure drop across the system. This, then, will modify mass flow rates or volume flow rates, or both, depending on the degree that flight induced ram compression balances with the thermally increased pressure drop. If the former is relatively low (ram pressure), as is the case at moderate flight speeds, the principal result will be to reduce the stagnation slot mass flow rate, but with good design the added heat energy can also be effective to reduce internal drag, which in any case will be small with proper diffuser and slot nozzle proportions and low velocity inflow. However, when the initial ram compression is equal to or greater than the thermally induced increment of pressure, the mass flow rate will remain substantially constant and the expansion can therefore only result in a corresponding increase in discharge volume flow rate and slot exit velocity, thereby converting the full pressure energy of the thermal expansion to momentum energy imparted to the upper surface boundary layer to decrease drag and also slightly increase lift (due to a further reduction in upper surface static pressure with higher velocity flow). Greater efficiency in the longitudinal flow control system will further improve the lower surface drag decreasing propensities of the transverse flow passages. It will be recalled that control of the transition phenomenon at high Reynold's numbers calls for the addition of kinetic energy to the flow as the laminar boundary layer develops instability or removal of such potential friction loss from the flow. Proper addition of heat energy to the integrated wing can well be a controlling factor in such matters at high speeds. To get the greatest possible amount of useful work from this thermal aerodynamic cycle, (i. e., increase of upper surface momentum energy) then, calls for an initial compression of the same order of magnitude as the potential back-pressure increase incident to the thermal energized expansion, and it follows that, heat may usefully be added to the system proportional to the increase of ram energy (i. e., as velocity squared). It would hardly be worthwhile, from a purely aerodynamic standpoint (except for reduction of internal drag), to consider this thermal energized addition to the integral flow control system for any airplane having normal operating speeds of less than 200 M. P. H. But at 300 M. P. H., for instance an exchange of sufficient thermal energy would increase the kinetic energy of the longitudinal type discharge jets about 11% which could well be effective to reduce wing drag by a considerably larger ratio, if such additional momentum were sufficient to convert a largely turbulent boundary layer into one predominately laminar. Also, calculations indicate development of not insignificant jet propulsive thrust, in the higher speed ranges, this being a function of the mass flow of air discharged and the difference in the square of the velocities of the jet and the main stream. While generation of thrust by this method is definitely considered to be of secondary importance, it should not be overlooked that the same system used to provide that thrust also reduces drag, which is an economical application of energy, especially, waste energy.

Based on several hypothetical designs of airplanes having conventional wing and power loadings, but equipped with a preferred wing of this invention, there appears to be more than twice as much waste heat available from the engine, for normal cruising power output at 300 M. P. H., than could be completely utilized by the wing to aerodynamic advantage. This suggests that the number or size of longitudinal slot openings might be increased with some benefit. Since the available waste heat increases almost as the cube of the speed, other things being equal, the indications are that at any attainable operating speed, there will always be more thermal energy available than could be completely converted into increased kinetic energy at the stagnation slot exit jet, unless a plurality of such jets is used. The curve shown by Fig. 4a plots the increase in stagnation pressure above atmospheric due to ram for a range of flight velocities from zero to 600 M. P. H. Since air at 32° F. will expand at constant pressure approximately equal to its increase in pressure at constant volume, substantially this same curve then, in this case, represents the relative increase in slot exit velocities attainable with thermally powered boost. One set of ordinates on the right hand side of the diagram also indicates the approximate heating of the internal airflow required to impart sufficient expansion energy to give optimum jet velocities at the various speeds. Quite obviously, substantial jet propulsive effects would obtain in the higher speed ranges, while important reductions of drag and correspondingly improved lift to drag ratios could be expected at more normal flight speeds.

This thermal powered aerodynamic boost completes the high speed flow integration of the inherent boundary layer control system and contributes decided advantages over the powered slot proposals of the prior art in that it provides a direct conversion of thermal to kinetic energy (i. e., a direct acting heat engine) without the impediment of moving parts or the loss of efficiency incident to the use of prime mover or secondary power converter mechanisms, such as various engine-blower combinations. Also, operating as a waste heat power system off the primary power plant of the airplane, the arrangement would, in effect, become a two stage engine delivering useful work (generating thrust and reducing drag) over a very considerable portion of the available heat cycle. In contrast to exhaust efflux propulsion, utilizing part of the available waste thermal energy for high velocity rearward discharge of the relatively low mass flow exhaust gas, to provide thrust only, thermal-powered aerodynamic boost converts, except for frictional losses, substantially all energy lost in cooling and in generating mechanical work, into kinetic energy, imparted to the much higher mass flow of air passing through the stagnation slot, primarily for reduction of wing drag, secondly and but incidentally, also providing thrust. The first system can only improve over-all thrust efficiency, while the second, in addition to such gains, also, increases aerodynamic efficiency and thus reduces the thrust and power required to attain a given speed. It is better economy to reduce drag than to expend power to overcome it.

The invention has been laid out diagrammatically to be disposed within the profile of a suitable basic airfoil section, GS-1, in this case, which type of airfoil lends itself particularly well to the development of the various characteristics to be found in the complete airfoil according to this invention. The distinctly asymmetrical profile illustratively but not limitatively used is shown in Fig. 5, and it will be noted that a wing or airfoil of appreciable thickness is secured so that adequate strength with structural simplicity can be provided, the principal structural elements being omitted in order to clarify the aerodynamic features of the wing. Obviously any other profile desired can be used in place of that of Fig. 5. In the diagram of Fig. 5, the airfoil 9 having chord line C—L, has the bulbous leading edge 10, which leads upwardly to a highly cambered upper surface 11 and downwardly to the slightly reverse curvature lower surface 12, having some degree of concavity in its afterpart. The airfoil surfaces converge at the rear and meet in the trailing edge 13.

A simple form of the invention utilizing the profile of Fig. 5 is shown in Fig. 6, in this instance composed of a relatively fixed portion, the chord line of which preferably permanently coincides with the appropriate part of line C—L of Fig. 5, and three rearwardly disposed articulated flaps, the chord lines of which flaps coincide with the appropriate parts of line C—L of Fig. 5 only in the high speed position shown in Fig. 6. The entering edge 14 of the upper segment or element 19 of the relatively fixed portion of the airfoil has an upper cambered surface 15, analogous to the surface 11 of Fig. 5 and terminates at 16 in a slot-lip or edge forming the trailing edge of the upper element 19 of the fixed portion of the airfoil. As noted this upper surface fixed portion may be of the order of approximately 50% of the chord of the entire airfoil. This proportion is obviously susceptible to wide variation. In the illustrative form, Fig. 6, the upper segmental element has a lower surface spaced from the upper surface 15, in place of the diagrammatic substantially skin thickness of the later described forms, and is comprised of a downwardly presenting upper stagnation-slot defining surface 17, curved into the leading edge at 14, and leading, by a relatively short jet emission generally slightly concave surface 18 to join with and form the under surface of the trailing lip 16. The leading edge of the lower segment or element portion 29 of the relatively fixed airfoil section is set back relative to leading edge element 14 of segment 19 and forms a secondary curved leading or slot entering edge lip portion 20, the lower surface 21 of which conforms to the lower surface 12 of Fig. 5 and terminates at the rear in the transverse hinge line or pivotal point 22, usually disposed somewhat forward of a vertical line passing through trailing edge 16 of the upper surface fixed portion. It will be observed that a slot entrance passage 23 exists between the leading edges 14 and 20, which lies in the general stagnation pressure region at the leading edge of the airfoil, such slot entrance passage being asymmetrical of the airfoil and directed forwardly and downwardly so that as the angle of incidence is increased and throughout the full range of wing incidence normally attained in flight, the rearwardly and upwardly extending stagnation pressure will be applied directly into entrance passage 23 leading to the stagnation pressure chamber 24 defined between the inner upper surface 17 and the inner lower surface 25, the latter comprising the upper surface of lower section 29. It will be apparent that the stagnation slot gradually diffuses downstream of slot entrance passage 23 so that efficient expansion of the internal airflow will obtain, thus lowering the effective kinetic energy with corresponding increase of static pressure energy within the slot, the relatively low velocity of the flow in the slot, particularly for the minimum camber-high speed position of the wing, being effective to minimize frictional losses. The general construction of the fixed forward portion of the airfoil is such as to readily accommodate a conventional open girder type of main wing spar and thus conduces safely to structural strength or can accommodate and house an engine to cool same, without appreciably adversely affecting the flow principles of the airfoil.

At the rear of the relatively fixed airfoil portion comprised of the spaced elements 19 and 29, is the first or primary articulated section or flap 39, having preferably a bulbous or well rounded leading edge 26 leading upwardly and rearwardly to extend into and form upper surface 27 of the same profile effect in part as the corresponding portion of the upper airfoil surface 11 of Fig. 5, terminating at the rear in a trailing edge lip or slot exit portion 28. The articulated section 39 includes suitable reinforcing elements to carry the rearward hinge 31 for the next adjacent secondary articulated section or flap 33. The lower surface 30 leads forwardly from hinge 31, to mergence into the rounded nose 26, past the complemental hinge portion attaching the primary section to the fixed portion 29 by hinge 22. The lower surface 30 in profile is similar to the corresponding portion of the lower surface 12 of the airfoil of Fig. 5, and is of special type permeable construction permitting free entry and flow of air impinging angularly against the surface, while being resistant to penetration of air flowing parallel to the surface 30. Any surface material may be used and illustratively that shown by Lougheed in his Patents #1,909,186, #1,880,207 and #1,903,823 is available for the purpose, although such material is purely illustrative and not limitative. In the high speed condition of the wing or airfoil shown in Fig. 6, at small angles of incidence indicated by the relative airflow in the direction of the arrow, it will be observed that the nose 26 forms a barrier or constriction at the rear of the chamber 24 for the central and lower portions thereof, while forming with the surface 18 and lip 16 a convergent and rearwardly directed discharge slot 32. Owing to the effective vertical clearance and relative overlapping between the lip 16 and the upper part of leading edge surface 26 of the primary section the rearwardly projected jet issuing from discharge slot 32 will flow downstream over upper surface 27 in a stratum generally tangential therewith to furnish a rearwardly impinging increment of high kinetic energy effective upon the boundary layer to decrease the loss of momentum within the latter over upper surface 27 and past the lip or trailing edge 28 of the primary section.

A secondary articulated or movable airfoil section 33 is provided similar in all essentials to the primary section 39 except for size and particular profile, in which particulars it will conform in its appropriate parts to the changed profile of the corresponding portions of the airfoil of Fig. 5, and having the rounded entering foil 34, the permeable lower surface 35 carrying edge the rearward hinge portion or element 36, and having the upper surface 37 terminating rearwardly in a trailing edge lip or slot edge 38, and at the forward portion defining with the lip 28 of the primary section a converging and rearwardly directing discharge slot 40.

It will be understood that the number of articulations may vary according to the requirements of any particular design, but in the illustrative form disclosed the airfoil is completed by the terminal or trailing edge section 41, which is preferably a closed section having the rounded entering or leading edge 42, the upper surface 43 defining at the forward surface with the lip 38 an upwardly and rearwardly converging discharge slot 44, and terminating in the trailing edge 45. The lower surface 46 extends between the trailing edge and the leading surface 42 and carries the complemental hinge element 36 to pivotally connect the sections 33 and 41.

In the illustrative form of the invention of Figs. 6 and 7, the articulations are spring loaded, and automatic in their action relative to the initial loading of the spring, and the resultant pressures induced on the respective sections of the wing throughout the speed range. The linkage is purely illustrative and diagrammatic, but enables the successful and smooth restrained change in camber and relative incidence with the proper degree of slot effectiveness desired for all conditions. The lower segment 29 carries the horn 47 to which the spring cylinder 48 is pivoted at its forward end. A link or connecting rod 50 engages a piston 51 or other connection to the spring 52 which illustratively is a compression spring normally tightly coiled. In the position indicated in Fig. 6 the link 50 has been retracted by the high speed resultant pressure on the flap system against the resistance of the spring 52. A generally vertical link 53 is pivoted at 54 to the upper segment 19 and is also pivoted at its lower end to the link 50, and has an extension 55 arranged to abut the adjustable stop 56 mounted on the lower segment 29 to selectively limit the change in camber of the articulated whole, said stop 56 preferably being manually adjustable. The primary articulated section pivoted at 22, has a link 57 pivoted to the vertical link 53 to control movement of the section relative to the fixed section on pivot or hinge 22. In this functioning the link 53 acts as a lever.

The secondary section is connected at its forward edge to a link 58 pivoted to the generally vertical link lever 60 pivoted at 61 to the upper part of the primary section, and at the bottom to the generally chordwise link 62 pivotally joined at one end to links 50 and 53 in a common connection and at the other by link 69 to the lever 63 pivoted at 64 to the secondary section. The lever 63 has a lower end pivoted to a link 65 and the latter engages pivotally a horn 66 on the trailing edge section 41.

Considering the device of Fig. 6, it will be apparent that there will be a relatively low volume inflow rate through the stagnation slot in the illustratively depicted high speed minimum drag camber of the composite airfoil. The conversely larger volume inflow rate in the slow speed high lift attitude of the airfoil, as shown in Fig. 7, resulting from the increased discharge slot opening and the higher total pressure drop across the stagnation slot system, will be evident.

The divergent conformation of the entrance passage and chamber 24 is such that most of the energy therein is in the form of high static pressure having relatively low velocities internally of the slot but capable of suddenly accelerated high jet velocities when emergent from the discharge slot 32. The rearward jet emission from discharge slot 32 induces laminar flow along the upper surface of the primary flap 39 and is projected beyond the lip 28 of the primary flap to reduce the pressure and exert an ejector action upon the discharge slot 40 between the primary and secondary flaps 39 and 33 augmenting the differential in pressure otherwise induced between the upper and lower surfaces of the composite wing or airfoil, to facilitate the permeation of the boundary layer over the lower surface 30 into the primary flap internal flow passage terminating in the discharge slot 40, and exerting a resultant high velocity laminar flow over the upper surface 37 of the secondary flap 33. This latter flow downstream over the lip 38 of the secondary flap or section 33, exerts a lowered pressure adjacent the discharge nozzle of discharge slot 44 again to augment the pressure differential between the upper and lower surfaces of the airfoil to enhance the permeation of the lower surface 35 by the lower boundary layer and to furnish a final jet emission of substantially laminar flow over the trailing flap or section 41. It is to be observed that this is the normal high speed functioning of the composite airfoil as shown by Fig. 6 and that the desired proportions and disposition of slots and permeation surfaces are also to be harmonized with correct profile shape of the several parts so as to give such distribution of pressures and velocities as to be conducive to optimum laminar boundary layer flow over the surfaces. One essential feature of the design is characterized by the forwardly and downwardly inclined stagnation slot entrance passage 23, so disposed in the airfoil leading edge region as to receive full free stream impact energy, or stagnation pressure, which is reconverted to kinetic energy imparted to the emergent air from the discharge slot 32. It will be clear that the size and disposition of said entrance passage 23 will vary somewhat with the profile shape and flow characteristics of the airfoil section forming the basic external contour of the composite integrated wing. Also, that the relative volume of internal airflow through stagnation slot chamber 24 will be a function of the size and disposition of the intake or entrance and discharge passages or slots, 23 and 32 respectively, and the pressure differential existent therebetween, other things being equal, which in turn is dependent upon the relative angle of attack of the wing and the airstream. The volume of such stagnation slot flow is maintained at a relatively low rate and thus low internal velocities by the minimal size of discharge slot 32 for the low camber-high speed attitude of the airfoil, in accordance with the relatively small, but properly applied amount of energy required for that condition to prevent transition of the flow from the laminar to the turbulent state. Thus, at high speed the flow will largely by-pass entrance passage 23 but at the same time be fully effective in communicating stagnation pressure to internal chamber 24. Similarly, discharge slots 40 and 44 present their minimal openings, as controlled by the relative disposition of flaps 39, 33 and 41, at minimum wing camber and these small discharge slots are coordinated with an angle of attack over the lower surface such that the entering permeation is minimal, again as required for prevention or delay or avoidance of the transition phenomenon in the lower surface boundary layer flow in the high speed range.

Referring to Fig. 7, it will be observed that as the angle of incidence of the entire airfoil is increased, and with it the stall danger as previously explained, the camber of the airfoil increases, as pressure of spring 52 overcomes lessened air loads on the flaps with reduced flight speed, so that the relative air stream continues to communicate its stagnation pressure energy directly into the entrance passage 23 of the stagnation chamber 24 at the same time that the exit opening or discharge slot 32 has enlarged because of relative swinging of the fixed portion and the primary flap, as will be clear. Simultaneously the openings of discharge slot 40 has been similarly enlarged and also the lower permeable surfaces have been angularly positioned out of their initial substantial parallelism with the relative airstream into an acute angular relation thereto resulting in a greater permeation stream entering the transverse flow passage leading to discharge slot 40. Thus, mass flow rates of both the longitudinal and transverse internal flow systems are largely augmented, due to enlarged slot exit openings with increased camber and relative incidence and largely augmented pressure differentials between upper and lower surfaces. This increased energy conversion between lower surface pressure and upper surface velocity (or low static pressure) energy is effective to induce a substantially higher pressure potential across the internal flow passages which in turn results in still greater total energy conversion. For the given conditions, i. e., the slow speed range, this high degree of intersurface energy conversion is directed primarily to control of the flow over the upper surface to prevent break-away by means of properly disposed large mass flow of high kinetic energy jets. It will be recalled that lift can only be increased so long as separation is avoided and that dangerous stall characteristics are associated with precipitous separation.

It is pointed out that while the linkage disclosed in Fig. 6 is arranged to cause the trailing edge flap 41 to swing up to the position shown in full lines in Fig. 7, it is part of this invention to reverse the linkage or to introduce a separate control so as to cause the trailing edge flap to be swung downwardly to the position shown in dotted lines in the latter figure. Illustratively this can be accomplished as shown in Fig. 6a, by providing a link 67 pivoted at 68 in flap 33, connected by a link 59 to the trailing flap horn 66. It will be seen that the rearward extension of the link 69 will cause the trailing edge flap to be swung downwardly. This obviously will induce a functional effect on slot 44 similar to that previously described of slot 40.

As shown in Figs. 6, 6a and 7, a composite extensible spring-loaded hydraulic unit 70 is located in link 65 in such manner and of such construction as to possess a preloading, which acting alone would deflect flap 41 dependently as a function of predetermined resultant aerodynamic pressure on flap 41 within a preselected speed range.

The hydraulic fluid contained by unit 70 communicates with suitable manually controlled operable means such for instance as right and left master cylinders 177 and 178 for the hydraulic pressure for flap actuation independently of flight induced pressures. This is schematically shown in Fig. 16.

It is to be understood that the advantageous features of the forms to be described can be associated with the devices of Fig. 6, just as those of the latter can be incorporated in the succeeding forms.

Referring to the forms of invention shown in Figs. 8 to 11 inclusive, the airfoil comprises a fixed leading edge or forward portion comprising upper airfoil segment or element 71 having the upper curved surface shown, terminating at the rear in portion 72 of discharge slot 73 to be described and forwardly terminating in the curved leading edge surface 74, and lip 75 for the stagnation slot entrance passage 81. An articulated section in the form of a slat 76 carefully nested upon the leading edge of the fixed portion of the airfoil is operable through the journalled sliding guide rod 77 extending forwardly through the entering edge 74. The lower surface 78 of the fixed portion of the airfoil terminates forwardly in the lip 80 forming with lip 75 asymmetrically disposed entrance passage 81 merging into the inwardly enlarged stagnation slot, or pressure chamber 82 having the constricted rearwardly directed jet emission outlet or discharge slot 73. The lower underlying surface of jet emission or discharge slot opening 73 is formed by curved leading edge surface 83 merging into upper flap surface 84 of primary flap 85 terminating rearwardly in upper slot edge 90, and pivoted at the bottom at 86 to the fixed portion 79. The flap 85 has the lower permeable surface 87 separated from the surface 84 of flap 85 by a median partition (or septum) 88 leading from the pivotal line 86, extending rearwardly and upwardly to termination in a secondary or intermediate discharge slot edge 89. The permeable surface 87 has a rearwardly disposed hinge element 91 to which a trailing flap 92 carrying the horn 93 is pivoted and upon which latter the guide vane or deflector plate 94 is mounted in slot-forming spaced relation to the bulbous entering or leading edge 95 of the secondary or trailing flap 92. Preferably in the high speed condition of the parts the small deflector 94 engages the under portion of the median partition at its trailing edge while the latter terminates slightly forwardly of the slot edge portion 90 to form a secondary stagnation slot exit 99. The trailing edge flap 92 may optionally contain the split flap element 95 or any other type of conventional flap, pivoted at 96 and actuated by cylinder 97 under the control of the operator.

The articulated sections of the airfoil of Figs. 8 to 11, inclusive, are actuated by suitable linkage coupled to sliding guide rod 77 at the rear thereof so that the aerodynamic or power or automatic manually controlled forwardly extension of rod 77 with slat 76 controls displacement of the related and interconnected movable segments of the airfoil to the position of maximum camber, substantially as shown in Fig. 11. A lever 100 is pivoted at the bottom at 101 to the inner lower surface of the forward fixed airfoil portion, and through a slot and pin connection 102 is attached slidably to the sliding rod 77 to give arcuate motion to lever 100, or if preferable, a shackle link can be used for interconnection of sliding rod 77 and lever 100. At a suitable distance from the lower pivot, elastic link 105 is pivoted to the lever 100 at 104. The link includes a cylinder containing a spring and piston assembly not shown in detail, or other pressure actuating means, by which the link has a normal length but which is susceptible to expansion or compression with excessive acceleration up-loads or down-loads, respectively imposed on the articulated sections, thus upsetting the pressurally balanced normal length of resilient unit 105. Obviously the pressure control elements of elastic link 105 can be designed for extensible or compressible response at any desired load factor, but it will be understood that under the normal forces imposed through changing wing camber with movement of slat 76, resilient link 105 will operate at and maintain constant normal length. The elastic link 105 extends rearwardly chordwise of the airfoil to a point of common pivotal connection with link 103 and lever 107, the latter in turn, pivoted at its other end to link 106 which pivotally connects with a horn on leading edge 83 of primary flap 85 lever 107, intermediate of its pivotal connections with links 103, 105 and 106, rocking about a fulcrum 109 attached to the fixed main airfoil portion. Link 103, similarly extends rearwardly chordwise through primary flap 85 and at its trailing end is pivoted to lever 108, in turn pivotally connected at its other end to link 110 which is pivoted to horn 93 on trailing edge flap 92, lever 108, intermediate of its pivotal connections with links 103 and 110, rocking about a fulcrum 119 attached to primary flap 85.

In the normal high speed condition and operation of the airfoil of Fig. 8, etc., the slat 76 fits snugly against the nose portion 74 so that flow over the entering edge of the composite airfoil is substantially similar to that over the airfoil of Fig. 6, or even the conventional airfoil of Fig. 5 over the upper surfaces, while the low velocity inflow through slot entrance passage 81 is still further converted to pressure energy with continuing decrease in velocity due to the diffuser proportions of stagnation pressure chamber 82. The air flowing through slot 82 at high pressure/velocity ratio is rearwardly discharged at high velocity/pressure ratio through the two relatively narrow width nozzle-like slot exits or discharge slots 73 and 99 with sufficient momentum energy to induce laminar flow in the boundary layer over the upper surface. It will be observed that the downstream stagnation discharge slot 99 formed between upper surface 84 and partition 88 of primary flap 85 is adjacently disposed immediately above the transverse flow discharge slot 129 formed by partition 88 and leading edge surface 95 of rear flap 92, said exit 99 discharging flow of higher kinetic energy content thus acting as an ejector nozzle to augment permeation inflow through surface 87 and its high velocity common discharge with that from exit 99 rearwardly over the upper surface of secondary flap 92.

As the energy available from the stagnation pressure alone may not be adequate to supply the desired high velocity discharge through two slots, it is contemplated to augment the pressure energy with thermal energy. To this end the heat exchange element 111 (Fig. 9) extending spanwise of the airfoil inside of the stagnation slot 82 is provided, if desired, and it will be understood that element 111 may be a conduit for circulating heat from the motors or the like, may include the motors themselves or may conduct the heated exhaust or the engine cooling air or all available waste engine heat, and may be suitably slotted or provided with any appropriate openings so as to enable the heated and more or less compressed gases in the element 111 to escape in metered amounts to equalize the mixture and flow of gases along the span of the airfoil. It may be further necessary to secure high efficiency in the internal airflow to provide a pair of deflector or diffuser vanes, respectively 112 and 113, in the stagnation slot entrance passage to avoid flow separation about element 111 or elsewhere in diffuser section or chamber 82. It will be understood that the added thermal energy will be utilized to augment the kinetic energy discharging from jet openings 73 and 99 when flight velocity is such as to give the required degree of ram energized stagnation pressure supercharge.

In conjunction with the rearward jet emission resulting from the stagnation energy conversion, the permeable lower surface 87 of the first articulated section will permit a slow (relatively), upward and rearward flow emitted through the discharge slot between the vane 94 and the leading edge of the trailing edge flap 92, as will be clear. The high velocity discharge of the stagnation pressure flow through the first discharge slot 73 accelerates the local stream and induces laminar flow which reduces the pressure over the trailing lip 90 beneath which the discharge from the second stagnation discharge slot 99 emerges with enhanced velocity because of the lowered pressure. The accelerated discharge from the second discharge slot 99 over the trailing edge flap effectively lowers the pressure over the discharge slot 129 to enhance the upward and rearward permeation flow.

The operation of the split trailing edge flap 95 by means of the operation of the cylinder 97 without affecting the rest of the airfoil will be clear from Fig. 9.

The avoidance of danger from sharp instantaneous overloads as by gusts and "bumps" and the like by the airfoil of this invention is shown in Fig. 10. In this figure a momentary reversal of camber secured in response to abnormal lift or thrust on the trailing edge flap 92 and the first articulated section 85 causes the trailing edge flap to be swung upwardly about its pivot 91, with a forward extension of link 110 which swings the lever 108 drawing link 103 rearwardly, so as to elongate the resilient link 105 without moving leading edge slat 76. Such extension of the link 105, against the resilience in the cylinder also swings lever 107 so as to force its attached link 106 forwardly pulling the upper portion of the articulated section 85 forwardly to swing the section about its pivot 86. Instantaneously such upward movement and swinging movement of the trailing edge flap and of the articulated section or sections, if more than one is used as is contemplated, may reduce the outlet area of the openings, but this will make no particular difference as it is for short durations only in the automatic operation of the device. Obviously if found desirable for any purpose the maintenance of such reversed camber condition and its mechanical and unautomatic attainment are available by introducing a control into the linkage. It will be clear that excessive down loads on the wing will reverse the above described resilient variable camber response to positive camber, again without affecting the position of leading edge slat 76 as shown in Fig. 11a.

Referring to Fig. 11 there is disclosed the automatic operation of the improved airfoil, utilizing the full maximum lift capabilities of the device under discussion. This situation illustrated represents the slow speed high lift condition approaching the stalling angle, when viewed in the light of conventional airfoils. The change of angle of incidence or attack is indicated by the arrow, and is characterized by the fact that at a certain angle the lift of the airfoil develops a component inclining forwardly which is automatically effective at a critical angle to extend the slat 76 with its sliding rod 77, to open the leading edge slot 79 through which the upflowing air stream is guided rearwardly over the upper surface of the forward portion of the airfoil as is common to this type of slot-forming slat device. At the same time the linkage has been so actuated that the link 103 is pulled forward actuating the attached levers 107 and 108 so that the articulation is swung downwardly about its pivot 86, while the trailing edge flap 92 is swung downwardly on its pivot 91. The increased camber widens discharge slot opening 73 so that the increased volume and relative velocity of air flowing over the upper surface of the airfoil past the trailing lip 72 of the fixed sections maintains a high velocity flow and reduces the pressure thereover so that separation is delayed and the differential in pressure across the slot is increased and thus the stagnation pressure flow through the slot 81, 82 and 73 is enhanced. This induces further high velocity-low pressure flow over the combined discharge slots between the trailing edge flap and the movable primary section to which it is attached. But the flow through the permeable lower surface 87 is increased because of the angular relation of the air striking same. At the same time the swinging of the trailing edge flap has brought the vane 94 into a position substantially extending the partition 88 to insure that the stagnation pressure discharge through discharge slot 99 is properly spaced chordwise from the discharge of the permeation flow through discharge slot 129. The action of the vane 94 in the connection relative to the flap 92 can be understood from consideration of the Griswold Patents #2,117,607 and 2,169,416.

A further modification is indicated in Figs. 12 and 13, with the linkage omitted, for the sake of clarity, as its construction will be obvious from what has preceded. The airfoil diagrammatically indicated in those figures comprises a fixed forward section comprising upper portion 120 having upper surface 121 and lower stagnation slot surface 122. A slat 123 to form a slot 124 in the operative position, is provided at the leading edge. The lower fixed portion 125 has the stagnation slot surface 126 and the lower airfoil surface 127. The fixed portion is suitably curved to form the asymmetrically disposed stagnation slot entrance passage or mouth 128, and the slot passage or chamber 130, and has a lip 131 relative to which the articulated section to be described has discharge slot opening movement to be described. The fixed lower forward portion 125 has a trailing edge pivot as in the earlier forms at 132 upon which the articulated portion or section 133 is pivoted, having the forward baffle or deflector 134 preferably fixed relative to section 133 and partly forming the rearward and lower surface of the slot passage or chamber 130, curving upwardly and rearwardly to partially define with the lip 131 a slot exit discharge opening nozzle or discharge slot 135. The discharge slot 135 is also partially formed by the surface 137 of the articulated section 133, to be described. Stagnation pressure energy is connected to a high velocity low pressure rearwardly projected jet or stream over the upper surface 136 of the articulated section 133 by the discharge slot 135 and the pressure differential existing between mouth or entrance passage 128 and discharge 135. The upper surface 136 extends forwardly and terminates in a downwardly curved slot-defining portion 137 forming with the rearwardly curving baffle portion 134 a permeation discharge slot or opening 138 leading into discharge slot 135, the exit proportions of which are completed by the spaced relations of surfaces 131 and 137. Alternately baffle 134 may be fixed relative to section 125 which will be effective to vary discharge slot 138 as section 133 is deflected. The lower surface 140 of the articulated section 133 is of permeable material through which air can relatively slowly permeate to discharge through discharge slot 138. Discharge slot 135 comprises a jet augmenter with respect to the flow discharged from slot 138 due to its higher energy content. The rear edge of the permeation surface 140 has a pivot 141 upon which the trailing edge flap 142 is mounted, the leading edge of which forms with the trailing edge lip 143 of the upper surface 136 of the section, a second permeation discharge slot or nozzle 144 which varies as the trailing edge flap swings upon its pivot. The split flap arrangements of the earlier figures may be incorporated with the trailing edge section disclosed, and the control may be either automatic or semi-automatic.

Referring to Fig. 13 it will be observed that the articulated sections have been swung on their respective pivots to increase the camber, and the angle of incidence has been increased as indicated by the arrow, as follows from the automatic operation of the device at higher angles of attack, and the slat 123 has extended to its operative position thus forming the slot 124. For this wing condition the air under stagnation pressure passes into the stagnation slot chamber 130, through which it moves at reduced velocity owing to the internal enlargement of the slot as has been explained, and having much greater energy pressure potential across the stagnation slot system due to the greatly enhanced negative pressure, augmented in turn by slot 124, effective upon discharge slot 135. The enhanced or increased velocity of jet discharge of the stagnation pressure through discharge slot 135 in turn reduces the pressure effective over the forward permeation slot discharge slot or outlet 138 to enhance the flow upwardly through the section 133, the entry of which is also enhanced by the increase of positive pressure over the lower permeation surface 140. Similarly the augmented flow and relatively increased kinetic energy from discharge slot 135 is effective to enhance the negative pressures over surface 136 thereby resulting in further reduction of low pressures at discharge slot 144 which in combination with the increased pressure of the permeation inflow cooperates to project an enhanced flow of higher kinetic energy content rearwardly over the surface of flap 142, similarly enhancing negative pressures over said surface of 142.

It will be understood that with the device of Figs. 12 and 13 any desired suitable energy augmentation devices, such as exhaust conduits from internal combustion engines, or heated elements connected therewith, or otherwise, may be resorted to in cooperation with stagnation slot pressure energy. If desired, additional external energy in other forms or applied in other ways may be similarly utilized to secure increased aerodynamic advantage.

In connection with all of the devices shown it is to be understood that the control of the camber and its relation to the mean angle of attack of the airfoil can be automatically controlled by the slat on the leading edge, or by manual control devices. It is contemplated that under certain conditions the relation of the articulations to each other and the camber conditions will be varied automatically as the shifting pressures on the sections cause a prearranged balance at different relative angular relations of the parts, so that operatively the effective airfoil condition will always be a result of and responsive to the air forces effective upon it.

For certain special aircraft designs where a relatively slow landing speed is not thought to be important, the integrated wing can be so modified as to be directed principally to boundary layer control in the high speed range, one such arrangement being illustratively shown by Figs. 14 and 15. It will be observed that in this particular modification of the essential flow integration principles of this invention, the leading edge slot and the primary flap have both been dispensed with, only a trailing edge flap 150 remaining as the main lift increasing element, though the high velocity rearward discharge 151 from the upper surface slot exit of slots 152 also makes an important contribution to slow speed flow control. There may even be designs not utilizing any lift-increasing flap, in which case the essential high speed flow integration of the invention may be provided by an airfoil similar to that of Fig. 14 except that the trailing edge element would not be pivotally mounted. One preferred feature provides that the lower surface 154 of the internal stagnation passage 153 contacts the external lower permeation surface 155 in such a way that inflow therethrough is divided into two separate spanwise ducts, respectively the forwardly or passage duct 156 and the rearwardly duct or passage 157, such forwardly disposed duct passage 156 communicating through the hollow main spar webs 157 with an upper spanwise leading-edge duct 158 above the stagnation slot passage—thus part of the transverse flow crosses the longitudinal flow without internal contact or mixing and is induced to higher velocity discharge over the upper surface through exit jet 159 by the high kinetic energy of the stagnation slot jet 151 downstream therefrom, in cooperation with the similarly high kinetic energy of the external flow upstream therefrom. The downstream permeation inflow duct discharges through the rearmost slot exit 160 over the upper surface of the trailing edge flap 150. It will be understood that it is not essential to divide the permeation inflow to the two slot exits illustratively disclosed in this case, since a common transverse flow duct with two or more discharge exits or slots could be used. The spanwise extending duct 161 carrying a mixture of the otherwise wasted engine cooling air and exhaust gases is diposed in the stagnation slot passage near its region of maximum expansion (greatest pressure). In the arrangement shown, the gaseous exhaust from such thermal duct discharging through slit 162 and intermixing, however, with the stagnation slot flow at a low pressure point near the high velocity exit common to both. Good design will secure substantially complete heat transfer between the two flows and thus the optimum conversion of thermal energy to augmented kinetic energy at the stagnation slot exit which it is possible to attain at any given pressure ratio of flight induced ram. In another modification, the thermal powered aerodynamic boost system might, alternately, comprise two spanwise ducts, perhaps one for engine cooling air discharge and the other for exhaust gas flow, disposed in the dual leading edge sections of the airfoil above and below the stagnation slot entrance passage, the thermal energy again being primarily utilized to augment boundary layer momentum with appropriate spanwise and chordwise distribution of heat and gaseous discharge, but it will be apparent that the suggested arrangement will also be effective to direct such thermal energy to the external flow as is required to secure non-icing of the wing.

It is pointed out that the proportions of the asymmetrically disposed entrance passage to the stagnation slot may vary widely according to the design requirements of any given airfoil. Thus the rate of diffusion of an entrance may be important and the fact that the bulbous lips of the entrance may have the slight diffusion of slot entrance passage 23 of Figs. 6 and 7, as well as slot entrance passage 128 of Figs. 12 and 13, or may have the abrupt separation of lips 75 and 80 of Fig. 8, etc., either as shown, or ameliorated or modified by the presence of diffuser vanes 112 and 113, and by the heat element 111 of Fig. 8, etc., is to be considered in designing the airfoil. Any combination of lips, whether they are both thin, or both bulbous, or whether short bulbous or long bulbous or whether a bulbous upper lip is associated with a thin lower lip, or vice versa, and whether the leading edges of the lips are close to the same vertical alignment, or with the upper lip far overhanging the lower, and whether this is with an additional leading edge slot, are all matters met according to the specific requirements of the airfoil and the functional effects desired of the slot entrance.

It will be understood that any large ducts may be used to convey thermal energy into the airfoil.

It is pointed out of this invention that the designation "airfoil" as used in the description and claims in general and is supposed to cover any operative manifestation of the invention that may be resorted to in whole or in part, as for instance as a wing of an aircraft, as a supporting or controlling surface or fin for aircraft, as an aircraft body or fuselage, as a nacelle, or any combination of these elements, as a rotor blade, whether helicopter or Autogiro or otherwise, or as a propeller or the like. Obviously its primary and preferred embodiment is in a wing.

The utilization of the airfoils described, in an aircraft, as wing elements thereof will be obvious, as will the fact that when used as the right and left hand wing elements on either side of the longitudinal axis of the aircraft they may be free for independent manual, or automatic camber varying operations in response to the flight pressure changes on the respective wings. On the other hand they may be interconnected for dependent actuation in the same or opposite directions, and in every case lend themselves readily to the imposition of manual control camber varying functions upon the wing portions.

Referring now to the schematic illustration of Figs. 16 and 19, there is disclosed a spanwise-extending rod 165, extending, across the longitudinal axis of the aircraft indicated by the dot and dash line, from inside of the left hand wing to termination inside of the right hand wing. Obviously this cross connection need only extend to given symmetrically disposed wing portions of the entire wing assembly. The left hand wing contains a plurality of bell crank levers respectively 166 and 167, to which are connected links respectively 168 and 170. The respective links extend chordwisely of the airfoil sections to pivotal engagement with the airfoil linkages or linkage systems already described. Illustratively they connect to the pivots 104 at the connection between lever 100 and elastic link 105, in the case of the form of airfoil shown in Figs. 8, etc., although they may connect to any other part of the chordwise linkage, as to lever 107 for instance in those figures, or to pivot 55 of Fig. 6 or the like as desired. The preferable disposition is such that with the change of balance or the shift of resultant aerodynamic pressure forces upon the airfoil assemblies, the variant longitudinal urge upon the chordwise linkage is translated into tension or compression impressed upon the rod 165 of the spanwise linkage, through the links and bell cranks described. The right hand wing portion contains bell crank levers 171, 172, etc., connected through links 173 and 174 to the desired portions or points of the chordwise linkage system of the airfoil sections of the appropriate wing portion, and, through pivotal connection to rod 165, ties or interconnects the left and right hand wing portions to dependent similar camber changing. This is a desirable aerodynamic effect of itself, and the resultant camber changing is as a resultant of all of the forces acting.

It being desirable in many cases to be able to impress a desired manual control camber changing function upon the respective right or left hand wing portions, a purely illustrative device is schematically indicated in Fig. 16. While it is to be understood that this function can be impressed directly upon the chordwise linkage in any desired manner, as by the actuation of the extensible link 70 of Figs. 6, 6a and 7, by which the attitude of a given section such illustratively as the trailing edge flap, is variable regardless of the relative attitude of the rest of the sections, or otherwise, yet in the illustrative form, the linkage is shown associated with the airfoil of Fig. 8, so that the selected camber variation of the airfoil is by means of varying the attitude of the trailing edge flap 95 of that figure. As previously noted this is accomplished illustratively merely by means of hydraulic cylinders 97. A plurality of these is indicated in Fig. 16 on both sides of the longitudinal axis, coupled by hydraulic power lines or the like 175 and 176, to the respective left and right power cylinders 177 and 178 each of which is respectively actuated by manual elements or pedals 180 and 181. It will be understood that the camber of either right or left hand wing section can selectively be varied independently of the other, or, obviously, with the other.

In the disclosure of Fig. 19, the parts are identical with those of Fig. 16, as so far described, although for clarity the separate individual camber controls are omitted. The rod 165 has a pivotal engagement with a controlling bell crank 182, connected through a further pivotal connection 183 with a floating lever 184 (broken away adjacent to the pivot 183 to indicate a longer extent of lever than is shown) having a handle 189 and slidable axially through a relatively fixed box 185, having at one side preferably a plurality of lateral recesses or fixation slots or stops 186, with which a stud 187 on the lever 184 can be selectively engaged and locked to temporarily fix or lock the linkage system in a desired condition associated with a particular desired camber condition of the wing system. When disengaged the stud 187 and lever 184 simply float back and forth relative to the fixed box, as the automatic variation of camber under varying flight forces continues. When a desired camber condition, for any particular flight situation is required, such as for landings, for take off, for rapid climb, etc., the lever is locked in the appropriate recess or stop for that condition. It will also be understood that the floating lever can be positively manually actuated to effect a desired camber setting regardless of flight force pressure balance in the set condition. If necessary power augmenting means may be used to secure such manual setting.

A very interesting and useful linkage is indicated in Fig. 18 in which the same assembly of bell crank levers with the same connections in the respective wing portions is secured, but in which the left hand bell cranks are pivotally connected to the spanwise rod 199, and the right hand wing portion bell crank levers are pivoted to a separate rod 191. Left hand actuated control lever 192 has one end engaged effectively by left hand rod 190, while the other end engages through cable 193 moving over the fixed pulleys 194 and 195 and engages the top end of a right hand actuating control lever 196. The latter effectively engages the right hand rod 191. The rods 191 and 190 (and the lower ends of the respective control levers 192 and 196) connect through cable 197 over fixed pulleys 198 and 200. A floating tie rod 201 carrying upper floating pulley 202 engaging cable 197, and carrying lower floating pulley 203 engaging cable 193, is arranged for floating in response to imposed pressures on a closed cable system comprising floating control bar or actuating lever 204 pivoted at 205, having a short cable 206 engaging the lower end of the tie rod, and having a longer cable 207 extending over relatively fixed pulleys 208 and 210 to the upper end of the tie rod.

With the floating actuating bar 204 held by the pilot in the mid position shown the linkage of levers, cables and pulleys, will transmit the push or pull of one rod, 190 or 191, through the linkage to exert push or pull on the complemental rod, 191 or 190, in the same direction. In this relation the actuated levers 192 and 196, swing in the same directions and remain in substantial parallelism during movement. It will be seen that as the tie rod and its pulleys moves upwardly or downwardly, either as a resultant of all forces acting on the rods 190 and 191 from the pressure forces on the wing portions during unrestrained floating of the bar 204, or as a result of pilot control of the lever 204, the cables 193 and 197 will respectively be tightened or loosened, and the levers 192 and 196 will swing oppositely apart either at the top or at the bottom, so that the variation in camber, while preferably always being dependent, is either in the same or in opposite directions. Note that this directional movement of the camber varying elements in the same or opposite directions may be both aerodynamic and manual. This enables perfect control of rolling moments and the maintenance of stability.

In the form of controlling spanwise linkage shown in Fig. 17, the same right hand assembly of rods and bell crank levers is disclosed as has been described of Fig. 18, although rod 191 is pivoted to a controlling bell crank lever 210, to which a pedal manual control element 211 is connected. The left side has a rod 212 connected to control bell crank 213 actuatable by pedal or other manual control element 214 on the other side of the longitudinal axis from pedal 211. A plurality of bell cranks respectively 215 and 216, carrying links 217 and 218, exactly analogous in attachment and function to links 168 and 170 of Figs. 18 and 19 is provided in pivotal relation to rod 212. Obviously if the pedals are left free to move they will float forward and backward with automatic variation of the camber of the respective independent wing portions.

It will be understood that the forms of linkage shown in Figs. 16 to 19, are purely illustrative, and that like the chordwise linkage the actual interconnection may be by gearing, push-pull wires, links, levers, hydraulic or pneumatic lines, or by electrical agencies. Such electrical coupling might for instance be by Selsyn motors. Such alternative actuation will be clear when the functions to be sought are understood.

Numerous further modifications and variations of the essential features of this invention can be suggested by those skilled in the art after perusal of this disclosure, the few drawings of which obviously can not attempt to cover the full scope of possible arrangements encompassed by the primary basic ideas of inherently so integrating the flow as to delay, or avoid the occurrence of, or secure better control over, both the transition and separation phenomena, with one and the same aerodynamic device, further improvement and desirable secondary effects residing in linkage assemblies therefor, and of judicious coordination therewith of waste thermal energy, all as more adequately covered by the appended claims.

Patentable matter shown and described but not claimed herein, is claimed in the companion application #405,083, filed August 1, 1941.

Having thus described my invention, I claim:

1. In an airfoil, means defining a passage having a relatively small exit and having a relatively large entrance in the lower surface of the airfoil, a member formed of permeable material covering said entrance and forming a portion of the lower surface of the airfoil, said material constructed and arranged to be pervious to airflow, including incipient and developed turbulent boundary layer flow, impinging angularly against said lower surface portion, and generally impervious to air flowing parallel to the lower surface of the airfoil, said exit being disposed in a region of low pressure relative to that existing at said entrance whereby inflow through said permeable material is effective to minimize energy loss in the lower surface boundary layer flow.

2. An airfoil as claimed in claim 1, said airfoil comprising a plurality of relatively movable and effectively articulated sections whereby the camber of the airfoil can be varied, a pair of adjacent sections cooperating to form said passage and to dispose said exit in the airfoil upper surface in such way that the passage is open and operable at all camber positions of the airfoil, the relative movement of the sections being further so arranged that increase of camber increases the size of the exit to augment relative energy of the flow through said passage for enhanced control of the separation phenomenon at low speeds and consequent increase of lifting statical pressure differentials between upper and lower airfoil surfaces.

3. An airfoil as claimed in claim 1, said airfoil comprising a relatively fixed section, a flap articularly associated with the fixed section for varying the camber of the airfoil, said section and flap defining said exit in such way that the relative discharge therefrom directed downstream over the upper surface of said flap varies as a function of the variation in camber.

4. An airfoil as claimed in claim 1, and means for augmenting the energy of the flow through the passage.

5. An airfoil as claimed in claim 1, and a leading edge slot device operably associated with the passage of said airfoil augmenting the flow therethrough to enhance upper surface separation control.

6. An airfoil as claimed in claim 1, and a supplemental device using external energy for augmenting the flow through said passage to enhance upper surface separation control.

7. An airfoil as claimed in claim 1 and a supplemental device using thermal energy for augmenting the flow through said passage.

8. An airfoil having a relatively large entrance passage, said passage upstreamwardly directed and forwardly disposed asymmetrically in the leading edge stagnation region of relatively high pressure, a relatively small nozzle-shaped discharge slot downstreamwardly directed and disposed rearwardly from said passage in a region of relatively low pressure, a chamber formed within said airfoil and establishing communication between said passage and said slot, said passage being formed by surfaces converging to a throat and diverging inwardly to merge into said chamber, means in the airfoil defining a permeation passage having a relatively small exit and having a relatively large entrance in the lower surface of the airfoil, a member formed of permeable material covering said entrance and forming a portion of the lower surface of the airfoil, said material constructed and arranged to be pervious to airflow, including incipient and developed turbulent boundary layer flow, impinging angularly against said lower surface portion, and generally impervious to air flowing parallel to the lower surface of the airfoil, said exit being disposed in said region of relatively low pressure which is lower than that existing at said entrance whereby inflow through said permeable material is augmented by the discharge from said slot into said region of relatively low pressure and is effective to minimize energy loss in the lower surface boundary layer flow.

9. An airfoil as claimed in claim 8 and means to augment the energy of the flow through the chamber and the permeation passage.

10. An airfoil as claimed in claim 8, and supplemental aerodynamically actuated means for augmenting the flow through said chamber and said last mentioned passage.

11. An airfoil as claimed in claim 8, and means for adding external energy to pressure energy of said chamber to increase the efflux velocity from said slot and to augment the flow through second mentioned passage.

12. An airfoil as claimed in claim 8, said airfoil comprising a plurality of relatively movable and effectively articulated sections whereby the camber of the airfoil can be varied, a pair of adjacent sections cooperating to form and locate said slot in the upper surface of the airfoil, and a pair of adjacent sections cooperating to form and locate said exit of said permeation passage in the upper surface of the airfoil in such way that the slot and exit are respectively open and operable at all camber positions of the airfoil, the relative movement of the sections being further so arranged that increase of camber increases the size of the slot and exit respectively to augment energy of the relative flow through said slot and said permeation passage respectively for enhanced control of the separation phenomenon at low speeds and consequent increase of lifting statical pressure differentials between upper and lower airfoil surfaces.

13. An airfoil as claimed in claim 8, in which said slot and said exit each comprise a discharge opening, said airfoil comprising a relatively fixed section, a flap articularly associated with the fixed section for varying the camber of the airfoil, said section and flap defining one of the discharge openings in such way that the relative discharge therefrom directed downstream over the upper surface of said flap varies as a function of the variation in camber.

14. An airfoil as claimed in claim 8, said airfoil comprising a relatively fixed section and at least one airfoil camber changing articulated relatively movable section in operative functional relation to the respective slot and exit of said chamber and said permeation passage in such way that the chamber and the permeation passage are functionally operative and mutually cooperative in all camber positions of the overall combination, a linkage system interconnecting said sections and responsive to flight pressure changes upon said movable section effective through said system to vary the camber of the airfoil inversely with change of flight speed throughout a preselected range thereof.

15. An airfoil as claimed in claim 8, said airfoil comprising a relatively fixed section and a plurality of airfoil camber changing articulated relatively movable sections in operative functional relation to the respective slot and exit of said chamber and said permeation passage in such way that the chamber and the permeation passage are functionally operative and mutually cooperative whereby the high velocity flow through the exit slot enhances the differential between the pressure at the entrance and the exit jet of said passage in all camber positions of the overall combination, a linkage system interconnecting said sections and responsive to flight pressure changes upon said movable sections effective through said system to vary the camber of the airfoil inversely with change of flight speed throughout a preselected range thereof, the rearmost section of the airfoil being so associated with said linkage system as to have dependent deflection in relative reverse direction to said camber varying movement so that said rearmost section will function as a balance tab for enhanced aerodynamically balanced variable camber control.

16. An airfoil as claimed in claim 8, said airfoil comprising a relatively fixed section and a plurality of airfoil camber changing articulated relatively movable sections in operative functional relation to the respective slot and exit of said chamber and said permeation passage in such way that the chamber and the permeation passage are functionally operative and mutually cooperative whereby the high velocity flow through the exit slot enhances the differential between the pressure at the entrance and the exit jet of said passage in all camber positions of the overall combination, a linkage system interconnecting said sections and responsive to flight pressure changes upon said movable sections effective through said system to vary the camber of the airfoil inversely with change of flight speed throughout a preselected range thereof, the rearmost section of the airfoil being so associated with said linkage system as to have dependent deflection in relative reverse direction to said camber varying movement so that said rearmost section will function as a balance tab for enhanced aerodynamically balanced variable camber control, and separately operable intermediate means for independent deflection of said rearmost section.

17. An airfoil comprising a plurality of articulated sections, linkage engaging the sections and adjustable through a predetermined range with changes in camber of the airfoil, said linkage including pre-loaded lost-motion means whereby the sections can yield from linkage adjusted positions.

18. An airfoil comprising a plurality of articulated sections, a linkage system engaging the respective sections and predeterminedly limiting the normal range of relative angular positions of the sections to those between two opposite extreme camber settings of the airfoil consonant with a normal predetermined range of loads imposed upon the airfoil sections and linkage, and means operatively associated with the linkage and sections and responsive to an airfoil load beyond the range of loads for which the system and sections were predetermined to release the limitation on the range of relative angular settings of the sections whereby a setting of airfoil camber beyond one of said extreme positions is provided.

19. An airfoil comprising a plurality of articulated sections, a linkage system engaging the respective sections and predeterminedly limiting the normal range of relative angular positions of the sections to those between two opposite extreme camber settings of the airfoil consonant with a normal predetermined range of loads imposed upon the airfoil sections and linkage, and means operatively associated with the linkage and sections and responsive to an airfoil load beyond the range of loads for which the system and sections were predetermined to release the limitation on the range of relative angular settings of the sections whereby excess-loaded settings of the airfoil camber beyond as well as inwardly of either of said extreme positions is provided.

20. A variable camber airfoil comprising a plurality of sections articulately interconnected, means comprising a train of mechanism connected to the sections aerodynamically controlling the relative positions of the sections to vary positive airfoil camber inversely with and dependently upon operating speed and responsive in camber setting to normal variation of flight pressures within a preselected range of speed, said means including preloaded resilient means for yieldably effecting positive or negative camber variation independently of speed in response to abnormal flight pressure changes, of a predetermined limit in excess of normal flight loads.

21. An airfoil as claimed in claim 8, in which said slot and said exit comprise discharge openings, said airfoil comprising a plurality of relatively movable sections, said sections being operably articulated whereby the camber of the airfoil can be varied, at least one adjacent pair of sections cooperating to form both said discharge openings and dispose them in the upper surface in such way that the respective discharge openings and thus the chamber and the last mentioned passage are open and operable at all camber positions of the airfoil, and the relative operable positions of the sections being further so arranged that increase of camber increases the size of at least one of the discharge openings to augment the relative airflow and thus enhance control of the separation phenomenon to maintain lift at reduced speeds, while enabling enhanced control of both upper and lower surface transition phenomena as camber is decreased at high speed to reduce drag.

22. An airfoil as claimed in claim 8, said airfoil comprising a relatively fixed section in which the first said passage is located, a plurality of camber-changing articulated sections, including a slot-forming flight-pressure responsive movable slat, said relatively fixed and downstream articulated sections forming said chamber and said permeation passage in such cooperative functional relation thereto as to locate said slot and said exit between adjacent chamber and said second mentioned passage-forming sections and to vary the size of the slot and exit with variations in camber, linkage engaging the sections and slat and adjustable through a predetermined range with changes in camber of the airfoil, said linkage including pre-loaded lost-motion means whereby the sections can yield from linkage-adjusted positions without relative movement of said slat in response to overload flight pressure changes in excess of a predetermined limit, said airfoil further including heat transfer means to convert thermal energy to kinetic energy within the space defined by the chamber and first passage to augment control of transition phenomena on the surface of the airfoil and to generate direct jet thrust from said slot.

23. An airfoil having a relatively large slot passage, said passage upstreamwardly directed and forwardly disposed asymmetrically in the leading edge stagnation region of relatively high pressure, a relatively small nozzle-shaped discharge slot downstreamwardly directed and disposed rearwardly from said passage in a region of relatively low pressure, a chamber formed within said airfoil and establishing communication between said passage and said slot, said passage being formed by surfaces converging to a throat and diverging inwardly to merge into said chamber, said airfoil comprising a relatively fixed section and at least one camber-changing articulated section, each of adjacent sections having surfaces cooperating to define said slot in such manner that it remains open and functionally but variably effective in all camber settings of the airfoil, and a linkage system interconnecting said sections and responsive to flight pressure changes upon said movable section effective to vary the camber of the airfoil inversely with change of flight speed throughout a preselected range thereof.

24. An airfoil as claimed in claim 8, said airfoil comprising a relatively fixed section in which the first said passage is located, a plurality of camber-changing articulated sections, including a slot-forming flight-pressure responsive movable slat, said relatively fixed and downstream articulated sections forming said chamber and said permeation passage in such cooperative functional relation thereto as to locate said slot and said exit between adjacent chamber and said second mentioned passage-forming sections and to vary the size of the slot and exit with variations in camber, linkage engaging the sections and slat and adjustable through a predetermined range with changes in camber of the airfoil, said linkage including pre-loaded lost-motion means whereby the sections can yield from linkage-adjusted positions without relative movement of said slat in response to overload flight pressure changes in excess of a predetermined limit, said airfoil further including heat transfer means to convert thermal energy to kinetic energy within the space defined by the chamber and first passage to augment control of transition phenomena on the surface of the airfoil and to generate direct jet thrust from said slot, the rearmost section of the airfoil being so associated with said linkage system as to have dependent deflection in relative reverse direction to said camber-varying movement so that said rearmost section is a balance tab for enhanced control.

25. An airfoil as claimed in claim 8, said airfoil comprising a relatively fixed section in which the first said passage is located, a plurality of camber-changing articulated sections, including a slot-forming flight-pressure responsive movable slat, said relatively fixed and downstream articulated sections forming said chamber and said permeation passage in such cooperative functional relation thereto as to locate said slot and said exit between adjacent chamber and said second mentioned passage-forming sections and to vary the size of the slot and exit with variations in camber, linkage engaging the sections and slat and adjustable through a predetermined range with changes in camber of the airfoil, said linkage including pre-loaded lost-motion means whereby the sections can yield from linkage-adjusted positions without relative movement of said slat in response to overload flight pressure changes in excess of a predetermined limit, said airfoil further including heat transfer means to convert thermal energy to kinetic energy within the space defined by the chamber and first passage to augment control of transition phenomena on the surface of the airfoil and to generate direct jet thrust from said slot, the rearmost section of the airfoil being so associated with said linkage system as to have dependent deflection in relative reverse direction to said camber-varying movement so that said rearmost section is a balance tab for enhanced control, and separately operable means for independently deflecting said rearmost section regardless of the setting of the linkage.

26. An airfoil as claimed in claim 1, said airfoil comprising a relatively fixed section and at least one airfoil camber changing articulated relatively movable section, said sections having surfaces cooperating to define the exit of said passage in such way that the passage is functionally operative and open to varying degrees in all camber positions of the airfoil, a linkage system interconnecting said sections and responsive to flight pressure changes upon said movable section effective through said system to vary the camber of the airfoil inversely with change of flight speed throughout a preselected range thereof.

27. An airfoil comprising a plurality of articulated sections, linkage engaging the sections and adjustable with changes in camber in the airfoil, said linkage including pre-loaded lost-motion means arranged to yield to a predetermined excess of loads over that by which the sections attain linkage-adjusted positions whereby the sections can yield from linkage-adjusted positions.

28. An airfoil comprising a plurality of articulated sections, linkage engaging the sections and adjustable with changes in camber of the airfoil, said linkage including resilient pre-loaded lost-motion means whereby the sections can yield from linkage adjusted positions.

29. An airfoil comprising a plurality of articulated sections, a linkage train engaging the sections and comprising an actuating movable element, and a push-pull link in the train, the linkage arranged for actuation by the movable element to swing the sections through a range of camber changes between predetermined extreme camber settings of the airfoil consonant with a predetermined range of flight pressures, said push-pull link being pre-loaded to retain its predetermined length during all camber changes between said extreme settings within said predetermined flight pressure ranges, but being arranged to yield and to effectively change its length automatically under flight pressures outside of the said predetermined range for which the linkage and section setting is predetermined, whereby the sections can assume an angular setting different from that which otherwise would attach to the instantaneous position of the said actuating movable element.

30. A variable camber aircraft wing system comprising a spanwise plurality of wing portions, each of said portions comprising relatively articulated airfoil sections, linkage means interconnecting a plurality of said sections of a wing portion and operably associated to control the relative positions thereof, said sections and linkage means of each wing portion being so constructed and arranged as to be responsive to variation of flight pressures within a preselected range of speed to vary the camber of said wing portion inversely with and dependently upon such variation in pressure, said camber variation of one wing portion being independent of that of another wing portion, and auxiliary means arranged to impress manual control-camber varying functions independently upon each of a pair of wing portions respectively disposed symmetrically on each side of the longitudinal axis of said aircraft.

31. A variable camber aircraft wing system comprising a spanwise plurality of wing portions, each of said portions comprising relatively articulated airfoil sections, linkage means interconnecting a plurality of said sections of a wing portion and operably associated with the sections to be adjustable accordingly to the relative positions thereof, said sections and linkage means of each wing portion being so constructed and arranged as to be responsive to variation of flight pressures within a preselected range of speed to vary the camber of said wing portion inversely with and dependently upon such variation in pressure coupling means interconnecting the linkage means of each of a pair of wing portions respectively disposed symmetrically on each side of the longitudinal axis of said aircraft symmetrically on each side of the longitudinal axis of said aircraft for effecting a resultant aerodynamically controlled camber setting for both of the wing portions of said pair, and auxiliary means arranged to impress manual control-camber-varying and selective camber fixation functions upon said respective wing portions of said pair.

32. An airfoil having a passage extending through the airfoil from the upper to the lower surface and terminating at the lower surface of the airfoil in a relatively large entrance, a member formed of permeable material covering said entrance and forming a portion of said lower surface, said material constructed and arranged to be pervious to airflow, including incipient and developed turbulent boundary layer flow, impinging angularly against said lower surface portion, and generally impervious to air flowing parallel to the lower surface of the airfoil, said passage terminating in a relatively small nozzle-shaped upper surface discharge exit rearwardly directed and convergently proportioned to discharge relatively high velocity flow downstream into and substantially parallel with the external local stream to control separation of the flow over the upper surface whereby inflow through said permeable material is effective to minimize momentum energy loss to control transition of the external lower surface flow, and means for augmenting the energy of flow through said passage.

33. In an airfoil, means defining a passage having a plurality of relatively spaced relatively small exits and having a relatively large entrance in the lower surface of the airfoil, a member formed of permeable material covering said entrance and forming a portion of the lower surface of the airfoil, said material constructed and arranged to be pervious to airflow, including incipient and developed turbulent boundary layer flow, impinging angularly against said lower surface portion, and generally impervious to air flowing parallel to the lower surface of the airfoil, said exits being respectively disposed in regions of low pressure relative to that existing at said entrance whereby inflow through said permeable material is effective to minimize energy loss in the lower surface boundary layer flow.

ROGER W. GRISWOLD, II

CERTIFICATE OF CORRECTION.

Patent No. 2,348,252.  May 9, 1944.

ROGER W. GRISWOLD, II.

It is hereby certified that error appears in the printed specification of the above numbered patent requiring correction as follows: Page 22, first column, lines 21 to 24 inclusive, and lines 46 to 49 inclusive, claims 15 and 16, strike out the words "whereby the high velocity flow through the exit slot enhances the differential between the pressure at the entrance and the exit jet of said passage"; page 23, first column, line 17, claim 23, for "slot" read --entrance--; page 24, first column, line 33, claim 31, for "accordingly" read --according--; lines 44 and 45, same claim, strike out "symmetrically on each side of the longitudinal axis of said aircraft"; and that the said Letters Patent should be read with this correction therein that the same may conform to the record of the case in the Patent Office.

Signed and sealed this 15th day of August, A. D. 1944.

Leslie Frazer
Acting Commissioner of Patents.

(Seal)